US 7,117,040 B2

(12) United States Patent
Masuda et al.

(10) Patent No.: US 7,117,040 B2
(45) Date of Patent: Oct. 3, 2006

(54) TOOL ATTACHABLE TO CONTROLLER

(75) Inventors: Masayuki Masuda, Kyoto (JP);
Yoshiyuki Nagao, Kyoto (JP);
Masanori Kadowaki, Kyoto (JP);
Toshimi Kudo, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/078,995

(22) Filed: Mar. 10, 2005

(65) Prior Publication Data

US 2005/0157543 A1 Jul. 21, 2005

Related U.S. Application Data

(62) Division of application No. 10/091,113, filed on Feb. 28, 2002, now abandoned.

(30) Foreign Application Priority Data

Mar. 12, 2001 (JP) ............................. 2001-068288

(51) Int. Cl.
*G05B 15/00* (2006.01)
*G05B 11/01* (2006.01)
*G06F 19/00* (2006.01)

(52) U.S. Cl. ............................. 700/1; 700/19; 700/20; 700/160

(58) Field of Classification Search ................ 700/1, 700/17–18, 19, 20, 160, 56–58, 83, 90, 80; 708/424
See application file for complete search history.

(56) References Cited

U.S. PATENT DOCUMENTS

| 4,862,067 | A | * | 8/1989 | Brune et al. | ............... 324/73.1 |
|---|---|---|---|---|---|
| 4,910,706 | A | | 3/1990 | Hyatt | ............................ 365/45 |
| 5,532,929 | A | * | 7/1996 | Hattori et al. | ............... 701/110 |
| 5,589,892 | A | * | 12/1996 | Knee et al. | ..................... 725/43 |
| 5,956,471 | A | * | 9/1999 | Ueda et al. | ................. 358/1.14 |
| 6,591,385 | B1 | | 7/2003 | Krech et al. | ................. 714/718 |
| 6,606,624 | B1 | * | 8/2003 | Goldberg | ........................ 707/6 |
| 6,721,941 | B1 | | 4/2004 | Morshed et al. | ............. 717/127 |
| 6,725,288 | B1 | | 4/2004 | Nagao et al. | ................... 710/8 |
| 2003/0113741 | A1 | * | 6/2003 | Bryan et al. | .................... 435/6 |
| 2003/0115602 | A1 | * | 6/2003 | Knee et al. | ..................... 725/42 |

OTHER PUBLICATIONS

Japan Patent Application No. 2001-068288, examination report dated May 9, 2005.
Patent Abstracts of Japan, publication No. 07-049651, *Device For Supporting Formation Of Control Program*, Tanaka Seiichiro, published Feb. 21, 1995, filed Aug. 09, 1993.
Patent Abstracts of Japan, publication No. 01-292401, *Method For Controlling Sequence*, Kajiwara Hiroshi, et al., published Nov. 24, 1989, filed May 19, 1988.
Patent Abstracts of Japan, publication No. 06-124103, *Programmable Controller*, Miyake Takashi, published May 06, 1994, filed Oct. 12, 1992.

(Continued)

*Primary Examiner*—Ramesh Patel
(74) *Attorney, Agent, or Firm*—Beyer Weaver & Thomas LLP

(57) ABSTRACT

A system is formed with a controller that is connected to and is adapted to control devices. A tool is attachable to the controller and functions to create control program for specifying the device by an object name, to create correlation data for correlating the control program with device data on the device, and to download the correlation data to the controller.

9 Claims, 21 Drawing Sheets

OTHER PUBLICATIONS

Patent Abstracts of Japan, publication No. 10-133715, *Communication Equipment System*, Masuo Yasuhisa, published May 22, 1998, filed Oct. 31, 1996.

Patent Abstracts of Japan, publication No. 05-274012, *Input/Output Allocation Variable Programmable Controller*, Hayashi Norio, published Oct. 22, 1993, filed Mar. 25, 1992.

Patent Abstracts of Japan, publication No. 10-082342, *Vehicular Controller*, Ikeda Yukio, published Mar. 31, 1998, filed Mar. 18, 1997.

Patent Abstracts of Japan, publication No. 03-142503, *Programmable Controller*, Ota Takashi, published Jun. 18, 1991, filed Oct. 27, 1989.

Patent Abstracts of Japan, publication No. 11-015520, *Remote Maintenance System For Industrial Equipment*, Ogushi Nobuaki, et al., published Jan. 22, 1999, filed Jun. 24, 1997.

Patent Abstracts of Japan, publication No. 11-259122, *Monitoring And Control System*, Awano Kiyoshi, published Sep. 24, 1999, filed Mar. 12, 1998.

* cited by examiner

FIG. 8

```
[Profile]
ObjName= ROBOT

DeviceNum=1
 DevName0=C
 SerialNo0=
 NodeNo0=8  // COMMUNICATION ADDRESS
 INSize0=2  /byte
 INadr0=    // MAPPED ADDRESS TO CONTROLLER MEMORY
 OUTSize0=2 /byte
 OUTadr0=   // MAPPED ADDRESS TO CONTROLLER MEMORY
 Communication0=0  // COMMUNICATION MODE
```

FIG. 9

```
ObjName= ROBOT

DeviceNum=3
 DevName0=C
 SerialNo0=
 NodeNo0=8
 INSize0=2
 INadr0=
 OUTSize0=2
 OUTadr0=
 Communication0=0

DevName1=A
 SerialNo1=
 NodeNo1=3
 INSize1=4
 INadr1=
 OUTSize1=4
 OUTadr1=
 Communication1=0

DevName2=B
 SerialNo2=
 NodeNo2=1
 INSize2=1
 INadr2=
 OUTSize2=1
 OUTadr2=
 Communication2=0
```

FIG. 11

```
BYTE Add_Val(BYTE X, BYTE Y)
{
  BYTE A, B; C
  Get_Attribute("IN_param1", A);
  Get_Attribute("IN_param2", B);
  C=A+B
  Set_Attribute("OUT_param1, C);
  Return C
}
```

```
[Profile]

ObjName= ROBOT

DeviceNum=1
   DevName0=C
   SerialNo0=
   NodeNo0=8   // COMMUNICATION ADDRESS
   INSize0=2   // byte
   INadr0=     // MAPPED ADDRESS TO CONTROLLER MEMORY
   OUTSize0=2  // byte
   OUTadr0=    // MAPPED ADDRESS TO CONTROLLER MEMORY
   Communication0=0   // COMMUNICATIONS MODE

[Attribute]
IN_Num=2
   ValName0=IN_Param1   // VARIABLE NAME
   ValSize0=1  // 1byte  // VARIABLE SIZE
   Adr0=0/0   // ADDRESS INSIDE CONTROL OBJECT (0 BIT OF 0 CH)
   ValName1=IN_Param2   // VARIABLE NAME
   ValSize1=1  // byte  // VARIABLE SIZE
   Adr0=0/8   // ADDRESS INSIDE CONTROL OBJECT (8 BIT OF 0 CH)

OUT_Num=2
   ValName0=OUT_Param1
   ValSize0=1  // 1byte  // VARIABLE SIZE
   Adr0=0/0   // ADDRESS INSIDE CONTROL OBJECT (0 BIT OF 0 CH)
   ValName1=IN_Param2   // VARIABLE NAME
   ValSize1=1  // byte  // VARIABLE SIZE
   Adr0=0/8   // ADDRESS INSIDE CONTROL OBJECT (8 BIT OF 0 CH)

[SERVICE]
```

FIG. 10

```
[Profile]

ObjName= ROBOT

DeviceNum=1
  DevName0=C
  SerialNo0=
  NodeNo0=8  // COMMUNICATION ADDRESS
  INSize0=2  // byte
  INadr0=    // MAPPED ADDRESS TO CONTROLLER MEMORY
  OUTSize0=2 // byte
  OUTadr0=   // MAPPED ADDRESS TO CONTROLLER MEMORY
  Communication0=0  // COMMUNICATIONS MODE
[Attribute]
IN_Num=2
   ValName0=IN_Param1  // VARIABLE NAME
   ValSize0=1  // 1byte  // VARIABLE SIZE
   Adr0=0/0  // ADDRESS INSIDE CONTROL OBJECT (0 BIT OF 0 CH)
   ValName1=IN_Param2  // VARIABLE NAME
   ValSize1=1  // byte  // VARIABLE SIZE
   Adr0=0/8  // ADDRESS INSIDE CONTROL OBJECT (8 BIT OF 0 CH)

OUT_Num=2
   ValName0=OUT_Param1
   ValSize0=1  // 1byte  // VARIABLE SIZE
   Adr0=0/0  // ADDRESS INSIDE CONTROL OBJECT (0 BIT OF 0 CH)
   ValName1=IN_Param2  // VARIABLE NAME
   ValSize1=1  // byte  // VARIABLE SIZE
   Adr0=0/8  // ADDRESS INSIDE CONTROL OBJECT (8 BIT OF 0 CH)

[SERVICE]
   ServiceNum=1
   ServiceName0=BYTEAdd_Val([IN]BYTE X[IN]BYTE Y)
```

*FIG. 12*

```
ObjName= ROBOT
DeviceNum=3
  DevName0=C
  SerialNo0=SN-01
  NodeNo0=8
  INSize0=2
  INadr0= AD1
  OUTSize0=2
  OUTadr0=AD2
  Communication0=0
  DevName1=A
  SerialNo1=
  NodeNo1=3
  INSize1=4
  INadr1= AD3
  OUTSize1=4
  OUTadr1=AD4
  Communication1=0
  DevName2=B
  SerialNo2=
  NodeNo2=1
  INSize2=1
  INadr2= AD5
  OUTSize2=1
  OUTadr2=AD6
  Communication2=0
```

TOOL ATTACHABLE TO CONTROLLER

This is a divisional of application Ser. No. 10/091,113 filed Feb. 28, 2002, now abandoned, which claims priority on Japanese patent application 2001-68288 filed Mar. 12, 2001.

BACKGROUND OF THE INVENTION

This invention relates to a tool attachable to a controller.

As is well known, control systems for use in industries are usually formed by appropriately combining controllers such as a PLC and devices which are controlled by such controllers. FIG. 1 shows a prior art example of such a system comprising a controller 1 to which a plurality of devices 3a, 3b are connected through a network 2. Control programs (also referred to as drivers) 4a, 4b for handling the devices 3a and 3b are installed in the controller 1. These control programs 4a, 4b are prepared individually for these devices 3a, 3b and serve to transmit and receive data to and from the corresponding one of the devices 3a, 3b by making use of an I/O memory 5 in order to carry out a specified process. Numeral 6 indicates a control program (X) for retrieving the control programs 4a, 4b. They may altogether form a task.

The devices 3a, 3b may be of different types. They may be of a type, such as ON/OFF sensors and digital I/O, serving to transmit and receive ON/OFF data to and from the controller 1. They may be of another type, such as photoelectric sensors (having the quantity of light and a threshold value as parameters) or temperature adjusters (having a target temperature and PID as parameters), having parameters to be set within the device and operated by a program prepared by the user.

Although FIG. 1 shows an example with the devices 3a, 3b connected to the controller 1 through a network 2, communications between devices and a controller may be effected through a bus within the controller. This would be a case if a building block-type PLC is used as the controller and motion control units and PID control units are directly connected to the slots on its base unit.

For carrying out such communications, it is necessary to correlate the control programs 4a, 4b with the devices 3a, 3b to be accessed thereby. For this purpose, it is normally done to assign node numbers serving as identifiers to be uniquely set on the network 2 for the devices 3a, 3b and to specify these node numbers to make an access. When the devices are connected through a bus, the node numbers become unit numbers, but the basic idea remains the same.

For the example shown in FIG. 1, the node number of Device A 3a is #5 and that of Device B 3b is #6. Thus, when Control Program A 4a makes an access to Device A 3a by message communication, the node number #5 for Device A 3a is written in the program.

It is convenient if a control program, after having been created, can be used again ("reuse") for another program because the trouble of creating a completely new program can be obviated and the labor for the development can be reduced. On the other hand, however, a control program (referred to as a driver) can manifest its usefulness only after this control program (software) is integrated into the device (hardware) to be accessed and it is preferable to treat the software and the hardware together. When a control program and a device is thus integrated together, it is hereinafter referred to as a "control object" or simply as an "object".

With prior art systems, however, there was no way to treat a control program and a device as an integrated object although individual programs could be reused in units of programs. Thus, the programs were reused only separately, and it was a cumbersome process.

It also happens sometimes, as shown in FIG. 1, to reconnect a device (such as Device A 3a which has been in use with a controller 1) to another controller 1' and to use it therewith, say, for changing, reinforcing or repairing a production line. If the user remembers the concept of control object introduced above and attempts to shift both the control program and the device to the reusing controller 1', the control program can be easily downloaded to the controller through a programming tool or a memory card provided to the controller, and the device (such as Device A 3a) can be shifted as hardware by connecting to the network 2' to which the controller 1' is connected.

With such a simple connection, however, the control object cannot be made operable. Although a configuration is required for carrying out communications with the device paired with the control program, the data which were being used by the controller 1 cannot be directly used for the operation.

This will be explained more in detail with reference to the example of FIG. 1. In this case, the node number of Device A controlled by Control Object A 4a was #5, to start with. Thus, Control Program A or Control Program X for retrieving Control Program A includes a portion where the node number #5 is specified for accessing Device A. In the reusing controller 1', however, the node number #5 is already used by another device. Thus, there will be an error if the portion of Control Program A or X containing the node number #5 is left unmodified. In the case of the example shown in FIG. 1, therefore, the portion of Control Program A or X must be modified to rewrite #5 as #2, which is the correct node number. This must be done, however, with extreme care such that the rewriting will not affect other programs.

It also happens sometimes that Device A is assigned differently in the I/O memories of the controllers I and I' (I/O configuration). Even if the programming style is such that the I/O memory 5 to which Device A is assigned to is accessed by specifying its address or by a variable programming, relevant portions of the program must be modified in view of the possibility that the assignment may have been changed at the time of a reuse. This makes the procedure cumbersome, and the operation cannot proceed if a wrong address is used.

There are also additional problems if a reassignment to the I/O memory 5 is required, as explained above, when a control object is to be reused, because the program developer must be aware of how the I/O memory 5 of the reusing controller 1' is being used, or the memory map showing where to find an empty area of a specified size. In other words, the program must be prepared such that empty areas can be efficiently utilized. During this process, human errors such as erroneous assignment are likely to take place.

It also happens sometimes that even the I/O assignment for an already assigned device is changed. In such a situation, the control program for the already connected device must be modified. Not only is this cumbersome but it also tends to increase the possibility of introducing errors.

As explained above, furthermore, there are devices such as photoelectric sensors and temperature adjusters that are provided with parameters to be set within the device. For setting such parameters and programs for such a device, it may be necessary to attach tools directly to the device or to the controller and to carry out setting of different kinds through such a controller.

Thus, if a device malfunctions and is replaced, the same work procedure that was carried out on the replaced device such as the setting of parameters must be repeated over again on the new replacing device. Such procedure is usually carried out manually by an operator according to data recorded either in a memory device or in a notebook. This means that input errors are likely to occur. It also happens frequently that such data are misplaced or otherwise difficult to find immediately or wrong data are erroneously consulted.

FIG. 2 shows another prior art system. If an error occurs in the device 3 in this system, there is a change in a bit in the I/O memory 5 of the controller 1 assigned to the device 3. If this change is detected by a display device 7 which keeps monitoring the I/O memory 5 of the controller 1, an error warning is outputted thereby. Explained more in detail, the condition of the device 3 is detected by system software (First Communication Process 8a, or "COMM PROC 1") of the controller 1 and is stored at a preliminarily specified address on the I/O memory 5 of the controller 1. A control program 4 in the controller 1 is monitoring this address of the I/O memory 5, and if a change in the condition (such as the "flag" condition) at this address is detected, the control program 4 indicates it at another address(say, by raising a flag at this address). When this happens, the control program 4 causes data such as the screen number to be displayed on the display device, numeral data such as an abnormality code and character array data (such as the details of the abnormality) to be stored in a specified area on the memory 5 according to the condition of the device. Such data are then transmitted to the display device 7 through the Second Communication Process (or "COMM PROC 2") 8b and stored in the memory 5 inside the display device 7 according to data received by its communication processing means (or "COMM PROC") 8c. The screen number at which the display is to be made on the display device 7 is retrieved by the image display processing means ("IMAGE DISPLAY PROCESS") 4c together with the data stored in the memory 5. As a corresponding image is retrieved from the image memory 9, the retrieved image is displayed.

Even if an abnormal condition in a certain device is thus indicated, however, it cannot be readily understood from the display what is the role being played by the device within the system. For example, the user may recognize a logical unit called "Robot" but if it is reported that there is an abnormality in a communication address of a device which is its constituent element or that there is an ON/OFF error at a certain bit of the controller to which the device is assigned, it is not easy at all to understand in what kind of control element an abnormality has occurred. Thus, it is usually required to consult a table of some kind to understand the logical meaning and to carry out a proper maintenance work.

Production lines include many pieces of equipment, each provided with a so-called human-machine interface (HMI) such as display devices and panel computers. When the value of a device connected to a controller is to be displayed, if the memory of the device is connected to the memory of the controller, the HMI consults the memory of is the controller to which the device is connected through communication and its value is displayed by the HMI. If calculations are required for the display, such calculations are usually carried out by a HMI suited for carrying out data-related programs.

From the points of view of program designers who design programs for HMI and display images and users who watch such HMI, it is desirable to collect data on devices by making an access with an object name for easy understanding. With a prior art system such as shown in FIG. 2, however, the user will initially have to map the memory of the device to the controller by I/O configuration and, after understanding its data, to use a tool of the HMI to specify the address of the memory of the controller.

Thus, if the memory of the device has been changed, say, as a result of an equipment change, the calculation program of the HMI must also be rewritten. Thus, when a control program and a data program are to be developed concurrently in parallel, the developer of one program must always be attentive of the development in the other program. This makes the development of various programs very complicated and time-consuming.

SUMMARY OF THE INVENTION

It is therefore an object of this invention to provide a tool attachable to a controller capable of handling a control program and a device together as an object (that is, a control object).

It is a further object of this invention to provide such a tool attachable to a controller that will allow a device to be reused reliably and easily without affecting unrelated control objects.

It is another object of this invention to provide such a took attachable to a controller that will not adversely affect control programs and data programs accessing a device when communication addresses or memory assignments are changed such that data programs and control programs can be created independently and parameters can be set quickly and correctly when a device is replaced by another one.

It is still another object of this invention to provide such a tool attachable to a controller capable of reporting an abnormal condition of a device or a controller in a user-friendly manner.

A controller embodying this invention may be characterized as storing both a control program for controlling a device connected to the controller and correlation data which correlate the control program with device data on the connected device. The control program specifies the device by an object name. When the control program accesses the device for controlling it, the controller's communication processing means references the correlation data to identify the device data from its object name.

The control of the device by the control program, by its broader sense of the expression, means to generally manage the device to make it carry out different processes. If the device is an input device, for example, the control program may serve to obtain data from this input device and to carry out specified processes. If the device is an output device, the control program may serve to transmit commands to the device and to cause it to carry out specified processes.

The correlation data serve at least as access data for enabling the control program to access the device, including data (such as the device name of the device) for the control program to identity the device and the memory address for actually indicating the address to be accessed such as the node number or the memory address assigned in a controller memory. Thus, the control program may be written in terms of device-identifying data such as device names but can access the target device by referencing the correlation data stored in the controller on the target device.

When the communication address of the device or the assigned memory address has been changed due to a reuse, the control program need not be rewritten because it is sufficient to update the correlation data. As a result, the device and the control program can be treated together as an integrated unit.

When a communication apparatus (such as HMI) makes an access to the device or monitors its operations, this can be done easily by referencing such correlation data. In other words, even if the control program is changed or the access address of the device is changed, these changes do not affect the data programs. Thus, control and data programs can be developed concurrently in parallel.

The correlation data include addresses through which an access can be made to a device. Such data may be manually inputted by the program developer, but there are simpler and more accurate ways. For example, a communication processing means may be provided not only for communicating with a connected device to thereby decide the access address but also for storing it as a part of the correlation data. Alternatively, a controller memory may be provided such that data are transmitted between the device and the controller through a specified area of this controller memory, and mapping means may also be provided for mapping (or allocating areas on) the controller memory according to memory size of the device and storing results of the mapping (area allocation) as the correlation data.

Some devices connected to the controller may be of a kind storing operation data (such as set parameters) required for their operation. Thus, the controller may preferably include means for functioning so as to obtain and store such operation data and to download the stored operation data to the device when the device starts its operations. In this manner, even the operation data are changed during the operation of the device, the matching between the actual operation data of the device and the data stored by the controller can be assured by storing the operation data in the controller at the end of the operations. The control and management of the operation data can thus be carried out more easily.

According to another embodiment of the invention, a specified area is reserved on the aforementioned controller memory for storing "abnormality data" when there is an abnormal condition developed in the device. It is preferable to provide means for outputting maintenance data for countering the abnormal condition according not only to the abnormality data but also the correlation data. The maintenance data may include the control object name, the device name and the communication address of the object or the device where the abnormal condition occurred, as well as the cause of the condition. Thus, it can be understood quickly, for example, to which of the objects the malfunctioning device belongs.

A tool embodying this invention is a tool to be attached to any of the controllers described above, characterized as comprising means for creating a control program, as described above, correlation data creating means for creating correlation data correlating the control program with device data on a device connected to the controller, and downloading means for downloading the correlation data created by the correlation data creating means to the controller.

A system embodying this invention is characterized as comprising a tool and a controller as described above and serving to download correlation data created by the tool to the controller and to cause the controller to control a device connected thereto by referencing the received correlation data.

When the correlation data are created as explained above, serial numbers and communication and memory addresses for actually specifying a device may be left empty. When the created correlation data are downloaded to the controller, the controller may serve to automatically fill these empty spaces, or such additional data may be manually created. Alternatively, such additional data may be included when the correlation data are initially created. Both modes of operation are intended to be within the scope of this invention.

Since the control program does not access a device by directly specifying the address of the device but by referencing the correlation data to ascertain the address for accessing the device, many improved methods of the controller become possible.

When a control program being used in a controller is to be used in another controller, the control program and the correlation data which correlate the control program with the device being connected to and controlled by the controller are associated together as forming a pair. The control program is copied to the other controller, and also the correlation data forming the pair with the control program are also copied to the other controller. The access address of the device in the correlation data is corrected by replacing it with another access address of the device in the another controller. Thus, the control program can be reused without modifying the control program itself.

When the correlation data include a parameter which at least represents operation conditions of the device, the controller may be operated so as to download the parameter for the device when the controller starts an operation and to upload and store the parameter set to the device at the end of the operation.

A so-called status recording area may be provided on the controller memory for storing status data individually for each of devices connected to the controller. The controller may then be operated so as to monitor this status recording area. When an abnormal condition is detected by thus monitoring the status recording area, the controller may access its memory means to obtain correlation data on the device associated with the detected abnormal condition and to transmit specified data to an external peripheral apparatus.

A data processor, including at least an equivalent of the control program, may be connected to the same network to which the controller and devices controlled thereby are connected such that communications between the controller and the devices can be obtained by the data processor as communication data. The data processor can carry out the stored control program according to the communication data received through the network and thereby carry out a data processing operation and transmit results of the data processing operation to the controller.

In summary, the present invention includes many inventive elements that can be combined in a countless number of ways. These inventive elements may further be individually realized by way of a dedicated hardware circuit or by a properly programmed computer.

BRIEF DESCRIPTION OF THE DRAWINGS

FIGS. 8, 9 and 10 show examples of object database.

FIG. 11 shows an example of control program.

FIG. 12 shows another example of object database.

Throughout herein, like components are indicated by the same numerals for the sake of simplicity of description and may not be described repetitiously even where these components are components of different systems.

DETAILED DESCRIPTION OF THE INVENTION

Figure 1:
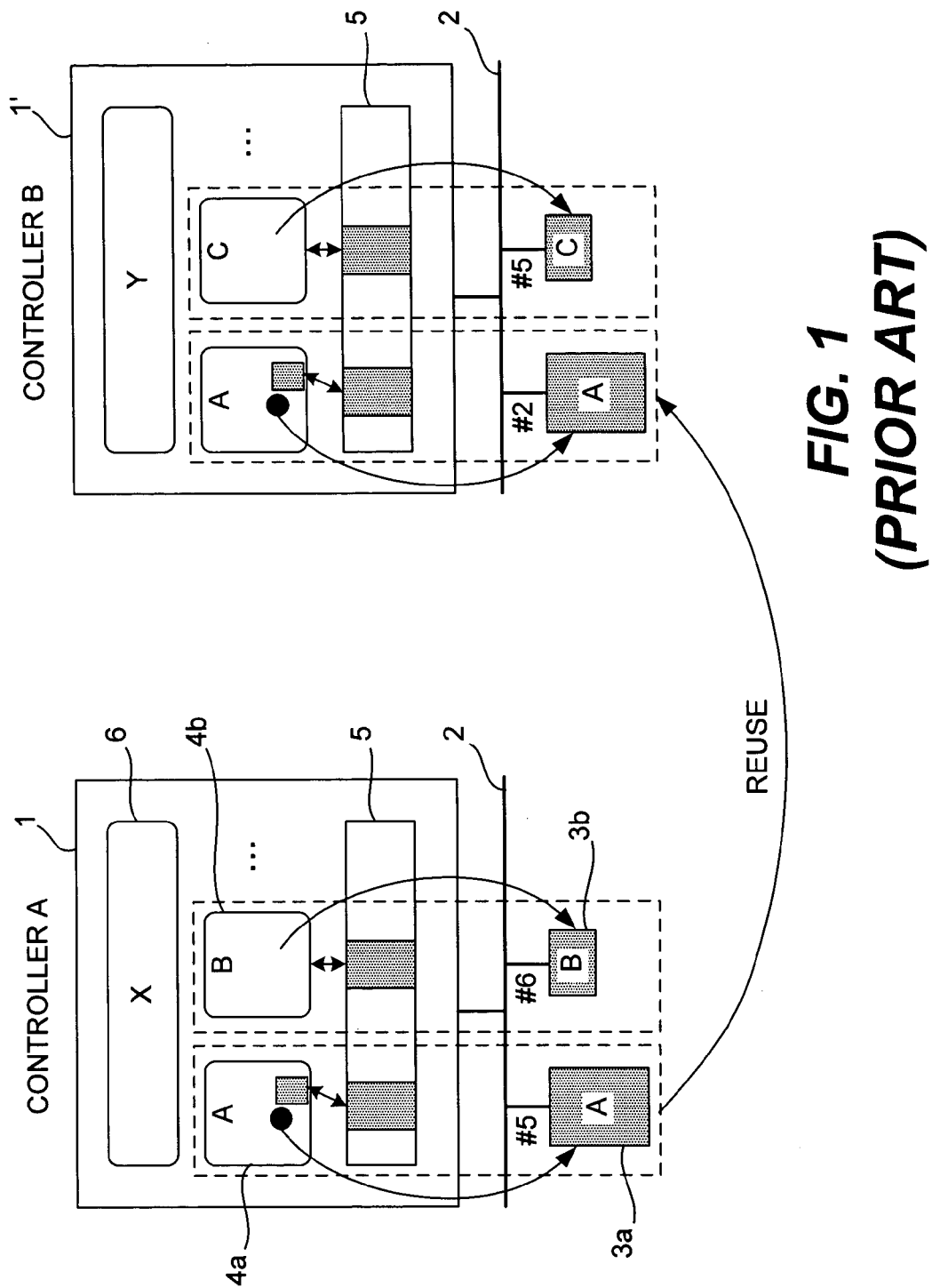
FIG. 1 is a block diagram of a prior art system.
Figure 2:
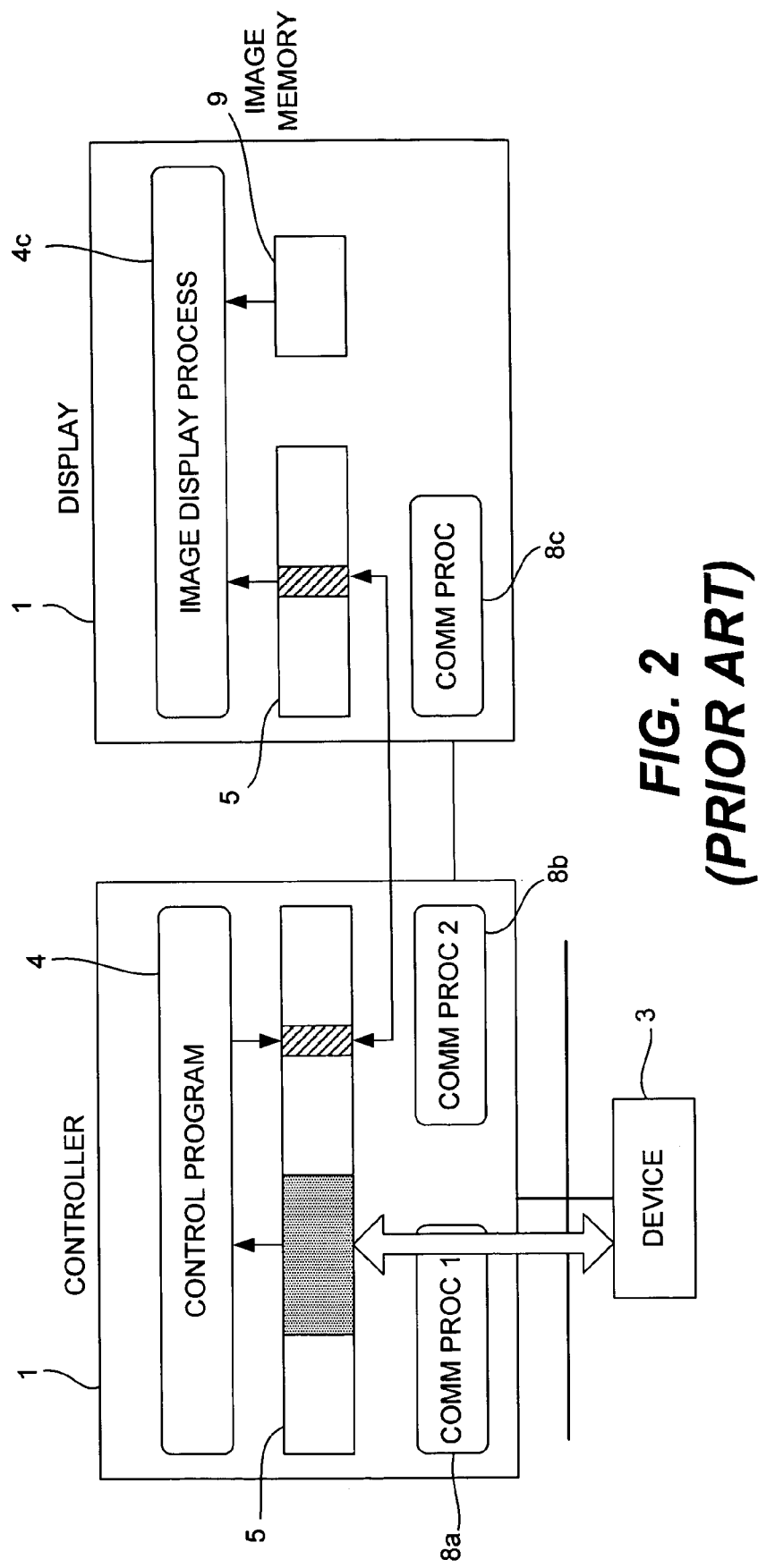
FIG. 2 is a block diagram of another prior art system.
Figure 3:
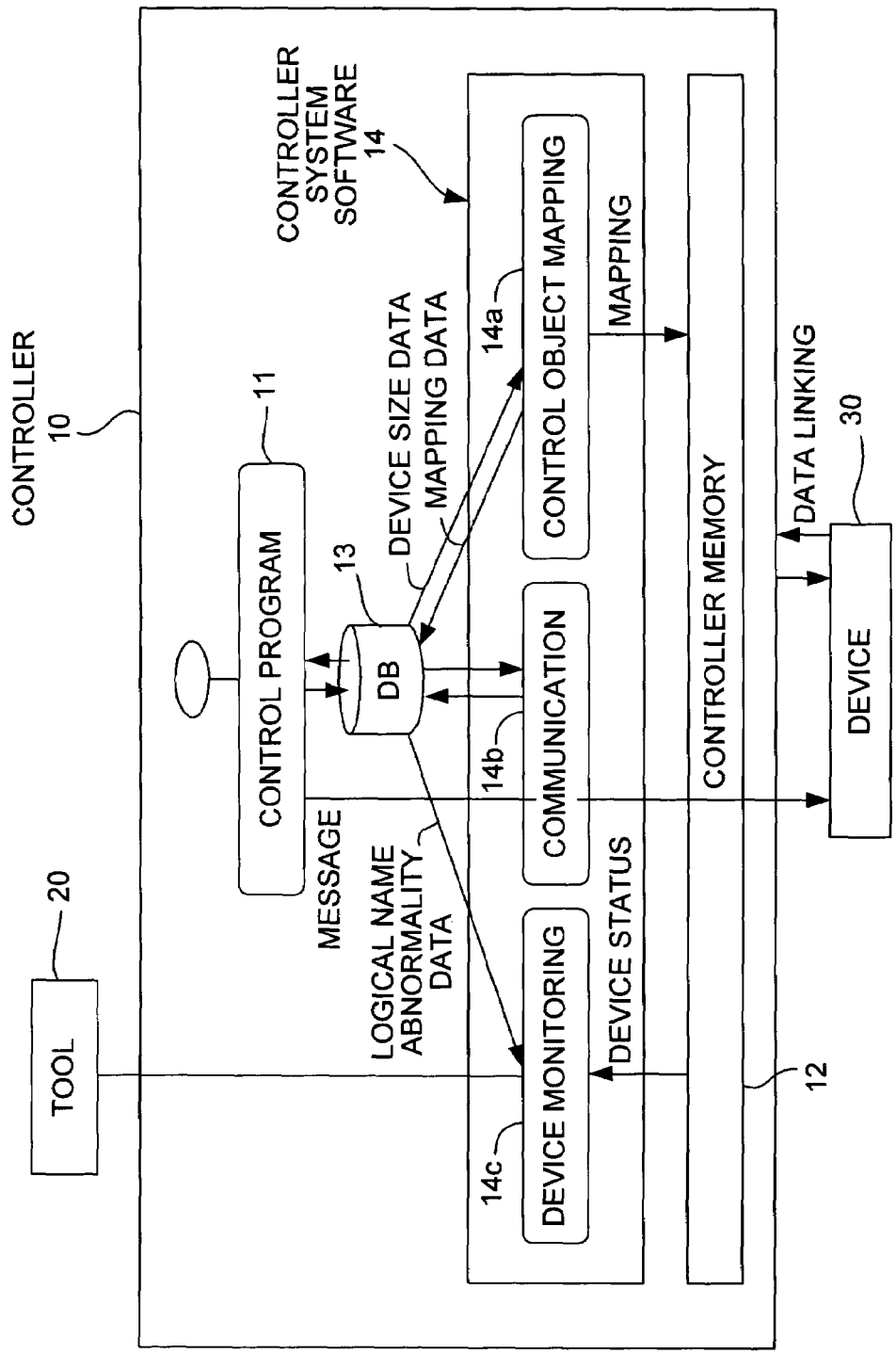
FIG. 3 is a block diagram of a system embodying this invention.
Figure 4:
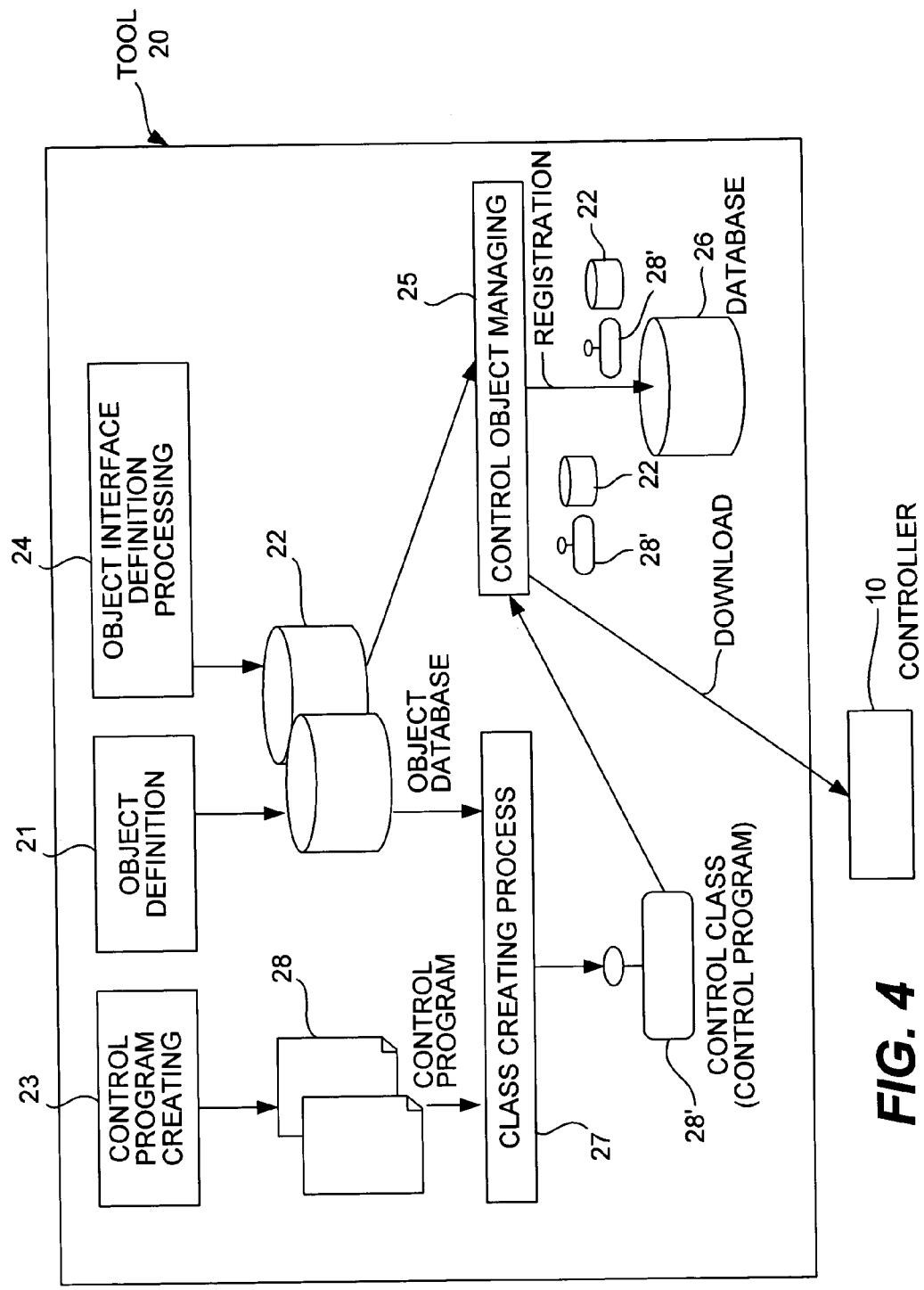
FIG. 4 is a block diagram of the tool shown in FIG. 3 to show its internal structure.

The invention is described next by way of examples with reference to figures. FIG. 3 shows a system embodying this invention, comprising a controller 10 such as a PLC and a tool 20 (of which the internal structure is shown in FIG. 4), a device 30 being connected to the controller 10 either directly or through a network. The controller 10 includes a control program 11 for managing the operations of the device 30. The device 30 serves to write and read data into or from a specified area of an assigned controller memory (I/O memory) 12. Since these functions are essentially the same as those of prior art controllers, they will not be further explained in detail. It is to be noted, however, that the control program 11 and the device 30 according to this invention can be handled as an integrated unit herein referred to as a control object (or simply as an object) and data which are necessary for carrying out such handling are stored in an object database (DB) 13.

Explained more in detail, the device 30 is specified by using its object name (a device name). When a device is called in a program, this used to be done by directly inputting its address. According to this embodiment of the invention, however, the device name is used for its specification and data showing where the device specified by its device name is actually connected are separately prepared, such data being also managed separately. As a result, when the control program 11 and the device 30 are connected to another controller for a reuse such that the addresses such as memory addresses and communication addresses may change, the user has only to modify the separately managed relationship between the device name and the address. The contents of the control program itself need not be modified.

For this purpose, the object database 13 stores therein "control object names" and "device data forming control objects" for distinguishing between device data which form control objects and devices by way of object names. In the above, "device data" include the addresses of devices (herein referred to as communication addresses) on a bus or a network. If the device can store the internal conditions of a PLC, for example, there are address data such as the device name defined for the PLC by the user and the area of the device such as a PLC storing this device name. If the device, such as a simple digital I/O, is not adapted to store the internal conditions, not only the device name defined by the user but also additional data such as the serial number of the device defined by the maker are also stored. Further, the interface data of control objects defined by the user (hereinafter referred to as object interface data such as the service name, the type data on the type of data necessary for the service), the object attribute name and attribute type). Thus, it becomes possible to learn from the object database 13 what kinds of devices constitute the control object and to distinguish a device by way of a logical name called object name.

Figure 5A:
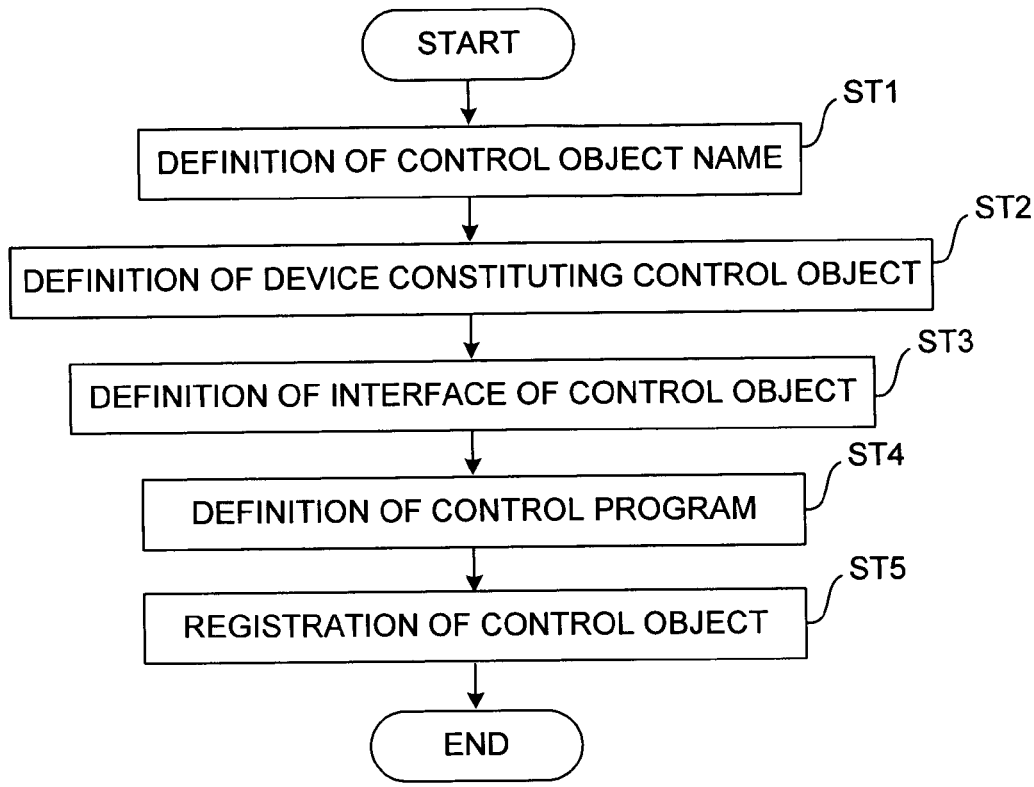
FIG. 5 is a flowchart for the initialization process carried out by the tool.
Figure 5B:
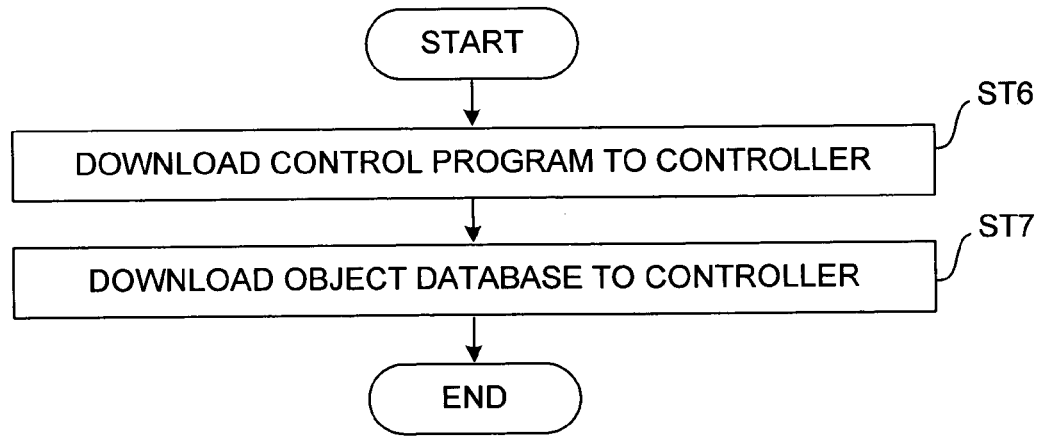
Figure 6:
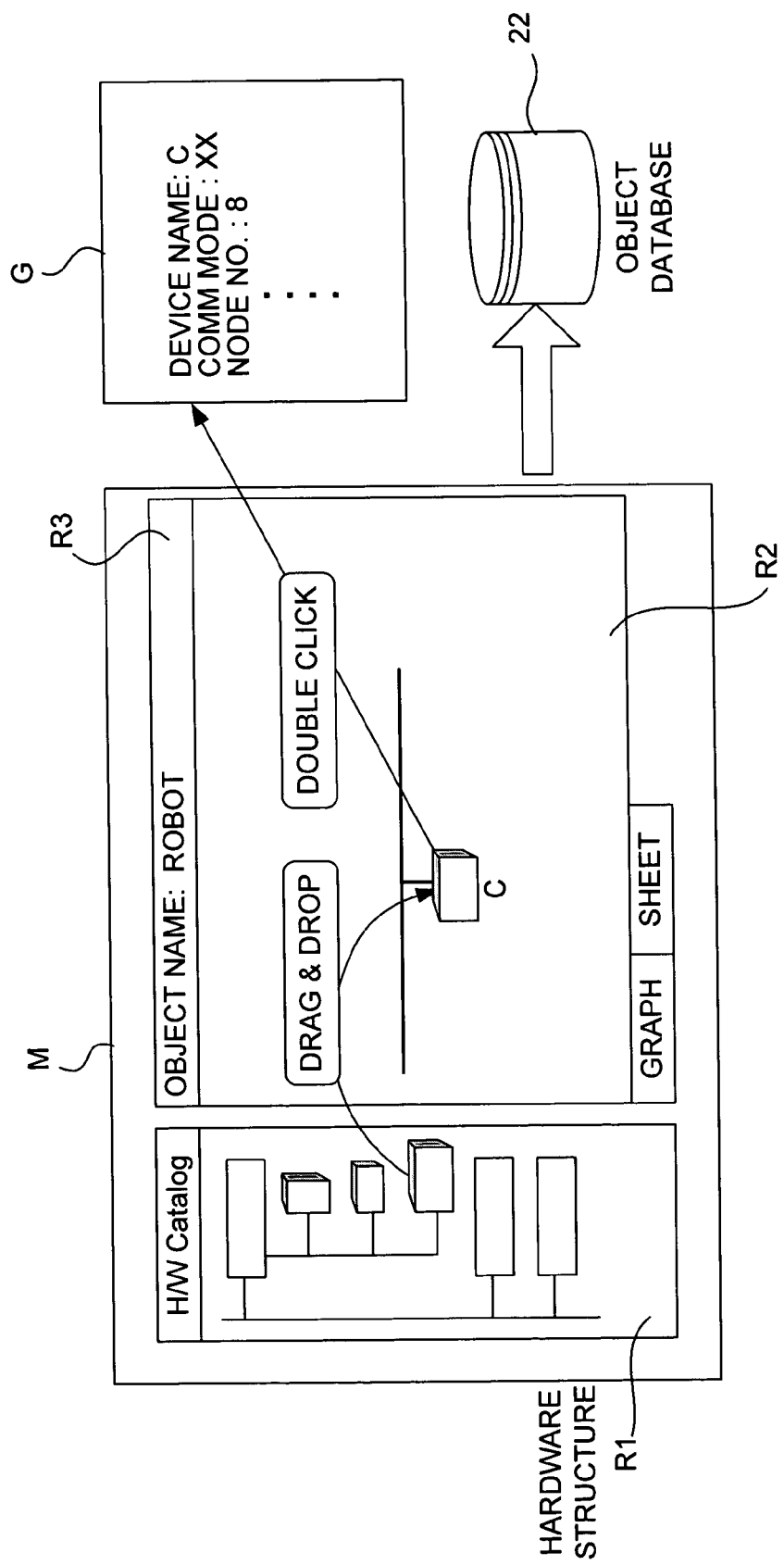
FIG. 6 is an example of display at the time of initialization.

Each of the data described above can be installed by downloading to the controller 10 what has been prepared by the tool 20. At the time of the downloading, necessary corrections are carried out on the data. The tool 20, which may comprise a personal computer or a computer of another kind, functions as shown in FIG. 5 to generate data to be stored in the object database. Its monitor screen M, as shown in FIG. 6, includes a list area (device catalog view) R1 for displaying a list (H/W catalog) of devices that can be connected, a work area R2 for actually assembling a control object on a graphic screen and a registration area R3 for registering the control object names being created as data on the work area R2. The user (developer) can thereby perform various tasks by observing this monitor screen M.

To start with, a control object name is defined by an object definition processing means 21 (Step ST1). This is done by operating the pointing device of the tool 20 to set its cursor in the registration area R3 and inputting a control object name by operating an input device such as a keyboard. The object definition processing means 21 serves to register the object name upon receiving such an input. FIG. 6 shows "Robot" as an example of registered control object name.

Figure 7:
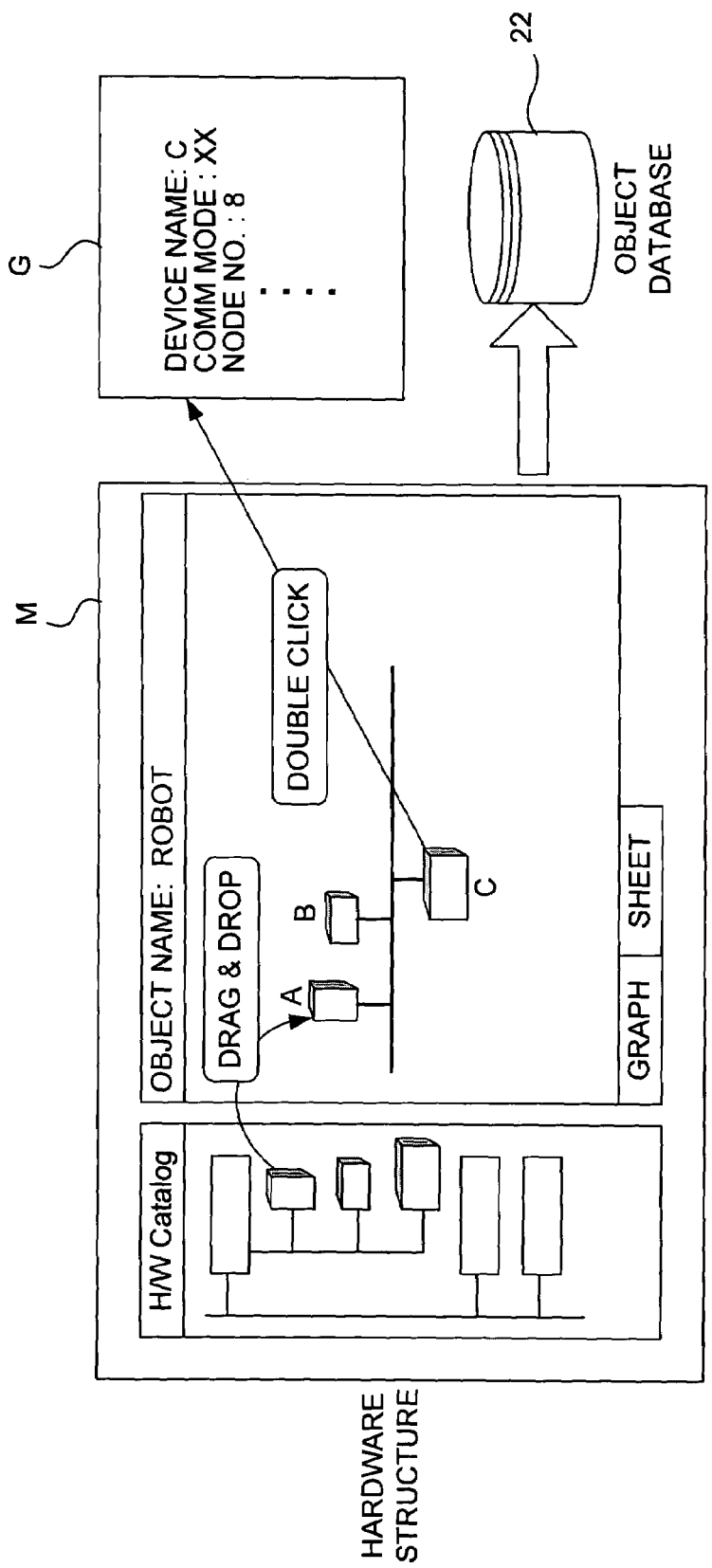
FIG. 7 is another example of display at the time of initialization.

Next, a constituent device of the control object is defined (Step ST2). This is done by selecting a device (class) to be used from the list area R1 of the monitor screen M shown in FIG. 6 and dragging and dropping it to paste it in the work area R2 on the right-hand side. If there are a plurality of devices, this process may be repeated a number of times to define the device structure necessary for the control object. FIG. 7 shows an example where three devices A, B and C have been selected.

Next, the contents of the devices thus selected are set. When each of the devices to be thus prepared is double-clicked, a setting screen G is displayed as shown in FIGS. 6 and 7. Although the setting screen G is shown for convenience outside the monitor screen M in FIGS. 6 and 7, it is actually shown superposed on the data in the work area R2. Necessary data for the configuration of network communication such as device name (such as "C" in the example), communication address, IN data size, OUT data size and communication method are inputted on the setting screen G. The object definition means 21 thereupon stores device setting data in the object database 22 in a specified file format such as XML and Ini on the basis of the inputted data.

Since basic data on each device such as device name, IN data size and OUT data size are already registered in the database as initial values, as it is double-clicked on a device, the initial values for that device are retrieved and displayed on the setting screen G. Thus, the user has only to fill the empty lines with appropriate information. FIG. 8 shows an example of the content of the object database 22 after data are thus set as explained above. Data on the devices A, B and C forming "Robot" come to be registered as shown in FIG. 9 by repeating such a process as explained above.

Device numbers (DeviceNum) and node numbers may be so arranged as to be automatically assigned, for example, by selecting unused numbers or in an ascending order. At this stage, the serial number, the starting address of the IN data (INadr0) and the starting address of the OUT data (OUTadr0) of each device are not registered yet.

Next, the interface of the control object is defined by an object interface definition processing means 24 (Step ST3). In real practice, the object interface definition processing means 24 serves to display the IN data size and the OUT data size as initial values and the user inputs definitions by watching such a display to have them stored in the object database 22. FIG. 10 shows for Device C that the data defined by the user for the lower one byte and the upper one byte of the IN area of the device respectively as In_pram1 and In-pram2_and for the lower one byte and the upper one byte of the OUT area respectively as Out_pram1 and Out_pram2 have been stored in the object database 22.

Next, control programs for the devices are written in (Step ST4). This is done by defining a control program created separately by a control program creating means 23 in a general-purpose language as one method of the control object and the selected control program is registered in the object database 22 as a service of the control object.

This will be explained by way of an example with reference to FIG. 11 by assuming that a control program called Add_Val has already been registered. In this situation, "Add_Val" is defined as one of the methods of the control object and a control program called "Add_Val" is registered in the object database 22 as a service of the object called "Robot". As a result, the interface data of the control object defined by the user (service name, types of data necessary for the service, object attribute name and its type) data on types are registered. Thus, the stored content shown in FIG. 8 becomes as shown in FIG. 12.

The control program may be written in Java, FB or VB. If it is written in Java, "Robot" becomes one of the classes of Java. If it is written in IEC1131, "Robot" becomes one of FBs.

Figure 13:
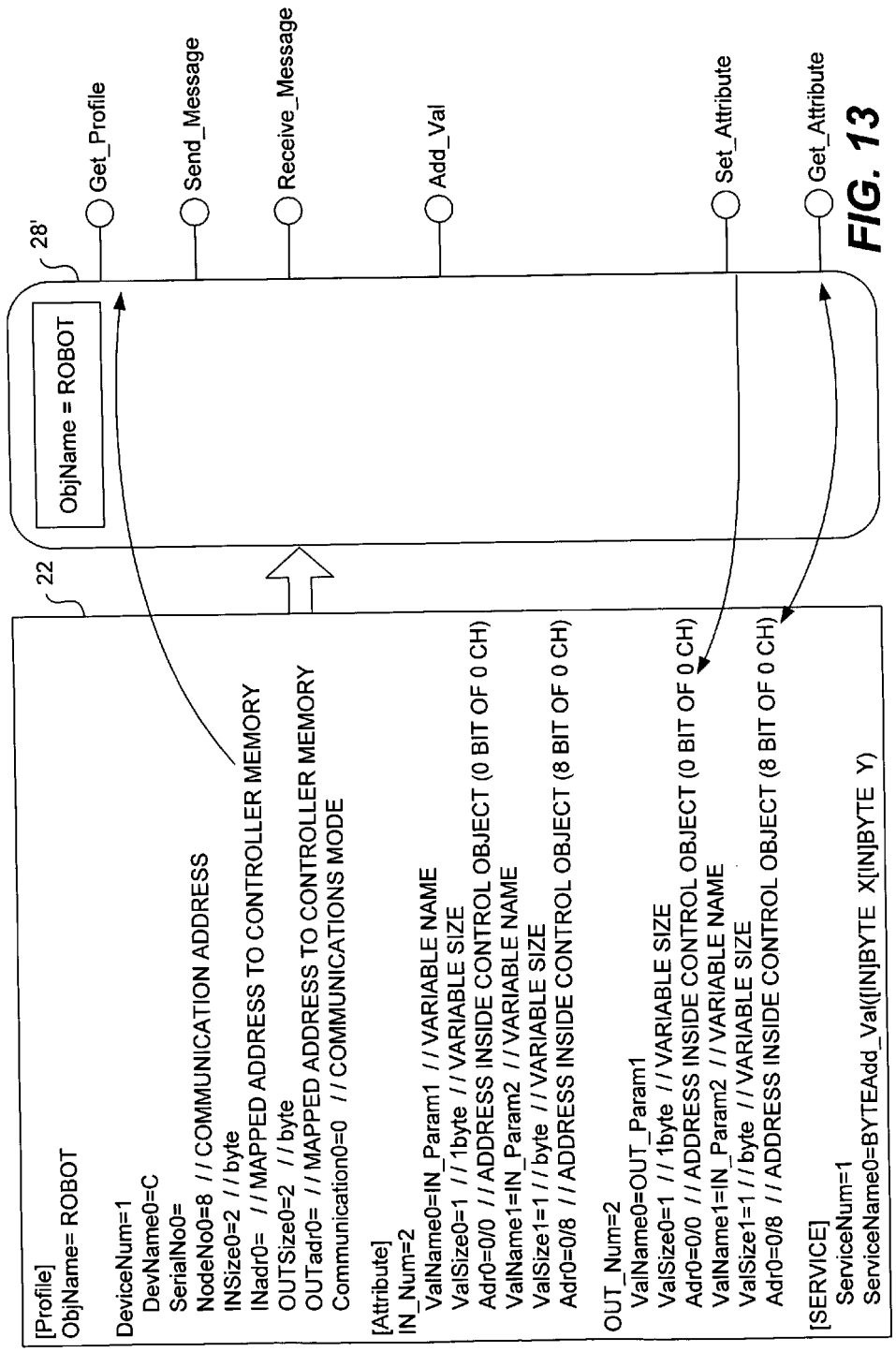
FIG. 13 shows the function of the class creation processing means.

The control object is then registered in a database 26 by a control object managing means 25 (Step ST5). At the time of the registration, the control object is created by consulting the object database 22. Here, the creation of the control object means creating one Java class code in the case of Java and an FB code in the case of FB. FIG. 13 shows a situation where a Java code has been created from the object database. The name "Robot" is stored as an attribute for the created Java class such that the object database 22 and the control program become correlated.

The control class corresponding to the control program thus registered in correlation is preliminarily created by a class creation processing means 27. As shown in FIG. 4, the class creation processing means 27 serves to consult the object database 22 to create a class in a general-purpose language from a control program 28 created by the user in the general-purpose language. The control object name stored in the object database is stored as an attribute of the created class. In the example shown in FIG. 13, a control program 28' storing control object name "Robot" as an attribute is created. The control program 28' (group of methods for the aforementioned class) and the object database 22 become correlated, and the control program and the device can now be treated as a pair and as a control object.

In addition to the services of control object created by the user, there are services created automatically by the system. "Get_Profile" is for retrieving profile data of the control object and serves, for example, to carry out a process for obtaining the communication address of a device forming the control object. "Send_Message" and "Receive_Message" are interfaces for sending and receiving messages to or from a device forming the control object. In the case of DeviceNet (registered tradename of Open DeviceNet Vendor Association, Inc.), there are parameters such as device name, class ID, instance ID and attribute ID. When this service is called, the communication address is obtained from the object database 22 by using as a key the device name which is one of the parameters, and the process of transmitting this parameter to this device is carried out. Thus, the program becomes enabled to access the control object not by specifying the communication address as the identifier of the device but by way of the object name. In other words, the device can be retrieved even if its communication address is not known or has been changed because the object name and the communication address are already correlated.

With reference back to FIG. 13, "Set_Attribute" and "Get_Attribute" are respectively for setting a value to an attribute of the control object and retrieving the value of an attribute of the control object.

The control object managing means 25 functions to download the control program 28' registered in the database 26 which has been created and the object database 22 to the controller 10 (Steps ST6 and ST7). If an environment exists in the controller for defining a control object, the control object managing means 25 records the control program registered in the created database and the object database at a specified address (memory address) of the controller itself.

Figure 14:
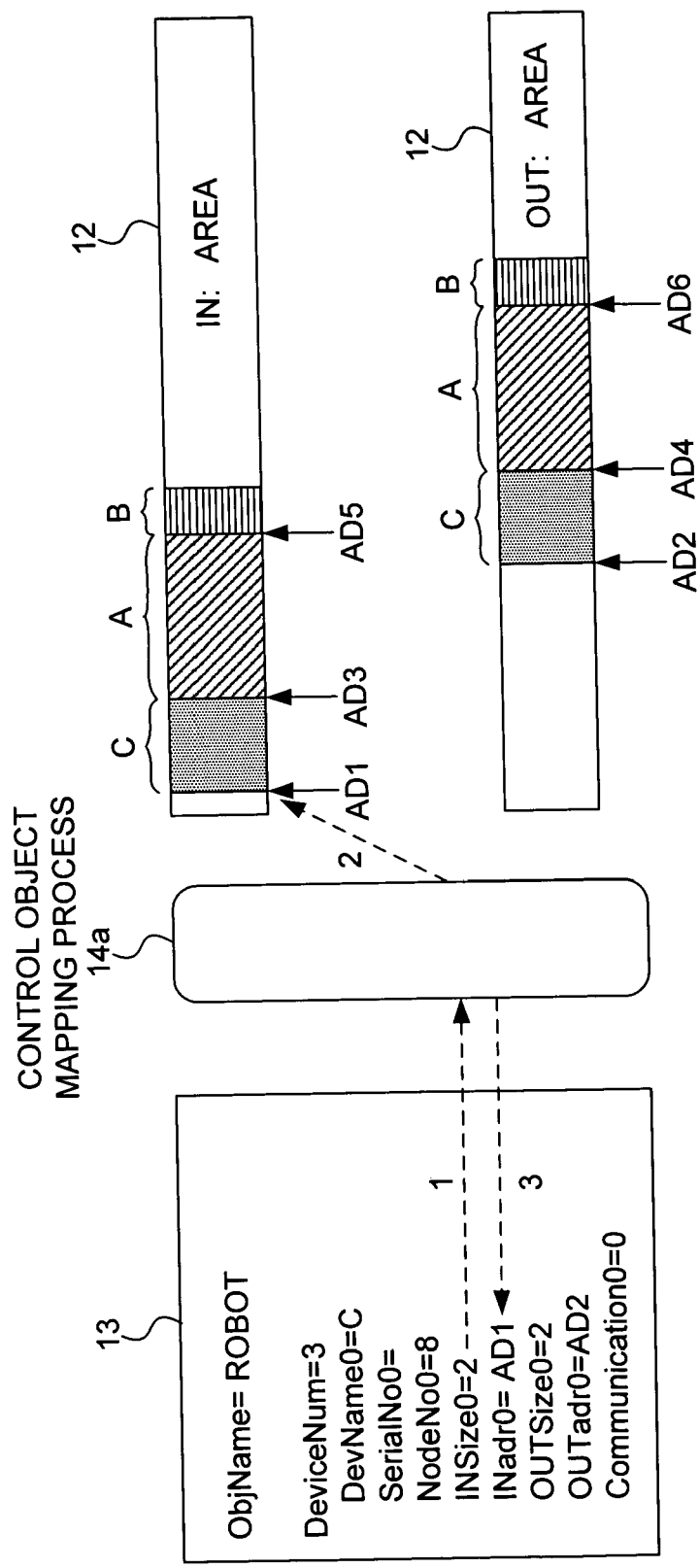
FIG. 14 shows the function of the control object assignment processing means.

On the other hand, the controller system software 14 (shown in FIG. 3) follows the data downloaded from the tool 20 (stored in the object database 13) causing its control object mapping means 14a to acquire the device forming the control object and its IN size and the OUT size by referencing the object database 13 (1) and to map the memory in an empty area of the controller memory 12 (2), as shown in FIG. 14. If the data on "Robot" are stored in the object database 13 as shown in FIG. 9, for example, the mapping for Device C is carried out by securing an area of 2 bytes from a specified empty address ("AD1" in the example of FIG. 14) in the controller memory 12 because the IN size is 2. In connection with this mapping operation, the starting address ("AD1") on the controller memory 12 where the mapping has been done is then stored in the object database 13 (3).

Figures 15, 16:
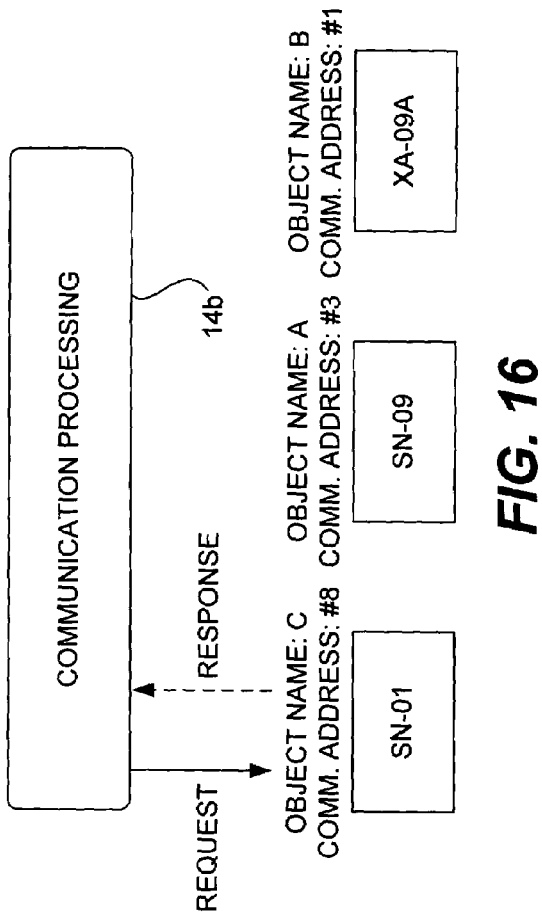
FIG. 15 shows an example of object database created by the control object mapping processing means.
FIG. 16 shows the function of the communication processing means.

Since the last address of Device C is known (being equal to starting address+IN data size), the next device (Device A) may be mapped with its starting address AD3 selected next to this last address. The result of this mapping is then stored in the object database 13. This procedure is repeated sequentially to map the IN data and OUT data of all devices. In the case of the example shown in FIG. 9, data as shown in FIG. 15 are created.

Next, the serial number of the device is obtained and registered in the object database 13. This is done, as shown in FIG. 15, by having the object database 13 accessed by a communication processing means to obtain data such as the node number and the device name of the device to be processed. The device name and the serial number for the device connected to the node number are requested and a response from the device is waited for. If the information transmitted from the device is correct (that is, if it agrees with the information registered in the object database 13), the serial number which has been transmitted is treated as a correct number and is registered at a corresponding area in the object database 13. In the example shown in FIG. 16, the device connected to node number #8 has device name (object name) C and serial number SN-01. Since this shows a matching, serial number SN-01 is stored corresponding to Device C, as shown in FIG. 15. Such processing is carried out for all devices such that an object database for Robot as shown in FIG. 15 is completed.

In the case of an apparatus capable of storing data such as a PLC, the device name of the device stored in the object database is written in a specified area for the device, the information on where to write in being stored in the object database. If the device name is already written in the device, a matching operation is carried out. If there is no matching, the abnormal situation is communicated, say, to an external peripheral apparatus. In this manner, the object database and the device can be correlated, and I/O configuration in units of control objects becomes possible. In other words, when a control program reads out a device, if the program is prepared with device names, the device name, the node number to which the device is connected and the memory address storing the IN/OUT data on that device are correlated by the object database 13 and hence an access can be made by using such correlated data.

When a control object (a control program+a device) is to be reused, the procedure is as follows. First, the control object managing means 25 of the tool 20 retrieves the control program and the object database to be reused from the database 26 which manages control programs and object databases and downloads the retrieved data (control program+object database) to the reusing controller 10. In the case of a tool of the object-defining type, a control program and an object database are downloaded as a pair if the control object is specified for downloading to the controller 10. Even if the control object is comprised of a plurality of control objects, the control programs and object databases of all related control objects are downloaded, and the devices 30 which form pairs with those control programs are connected to the controller 10 either directly or through a network, depending on the circumstances of the use.

Figure 17:
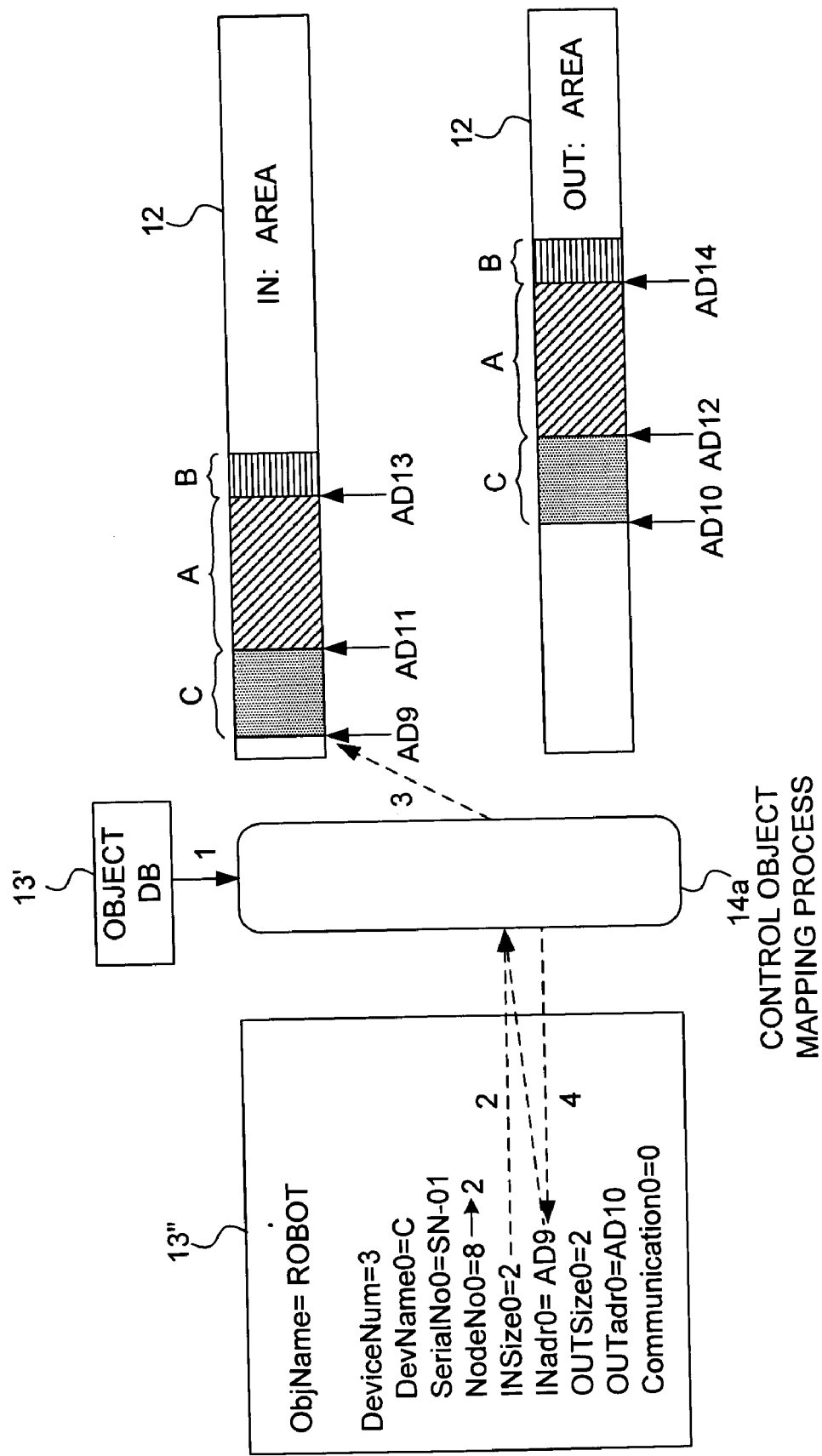
FIG. 17 shows the function of the control object mapping processing means at the time of a reuse.

The control object mapping means 14*a* of the reusing controller 10 functions to detect an empty area by consulting an already existing object database 13' as shown in FIG. 17 and to map the controller memory on each of the devices of the newly downloaded object database. This is done by obtaining mapping data (IN/OUT size and mapping address) from the existing object database (1) and obtaining mapping data (IN/OUT size) from the object database of the control object downloaded for the reuse (2). Thereafter, the mapping is carried out (3) to the empty area of the controller obtained in process (1) regarding the new device obtained by process (2). Next, the mapping data (the start address mapped to the controller memory 12) are stored in the object database 13" (4). The memory mapping of the newly downloaded device is thus completed. Since the mapping is done to an empty area, the already existing object database 13' is not affected, although it is permissible, if necessary, to change the address mapped to this already existing object database 13' at the time of this mapping process related to the reuse. Even if such a change is made, it is only in the area of the object database 13' storing the start address where data are updated, and the control programs for existing devices are affected because they are called by device names. Since the processes (2)–(4) described above are basically similar to processes (1)–(3) of FIG. 14 for a new mapping, detailed explanations will be omitted.

Figure 18:
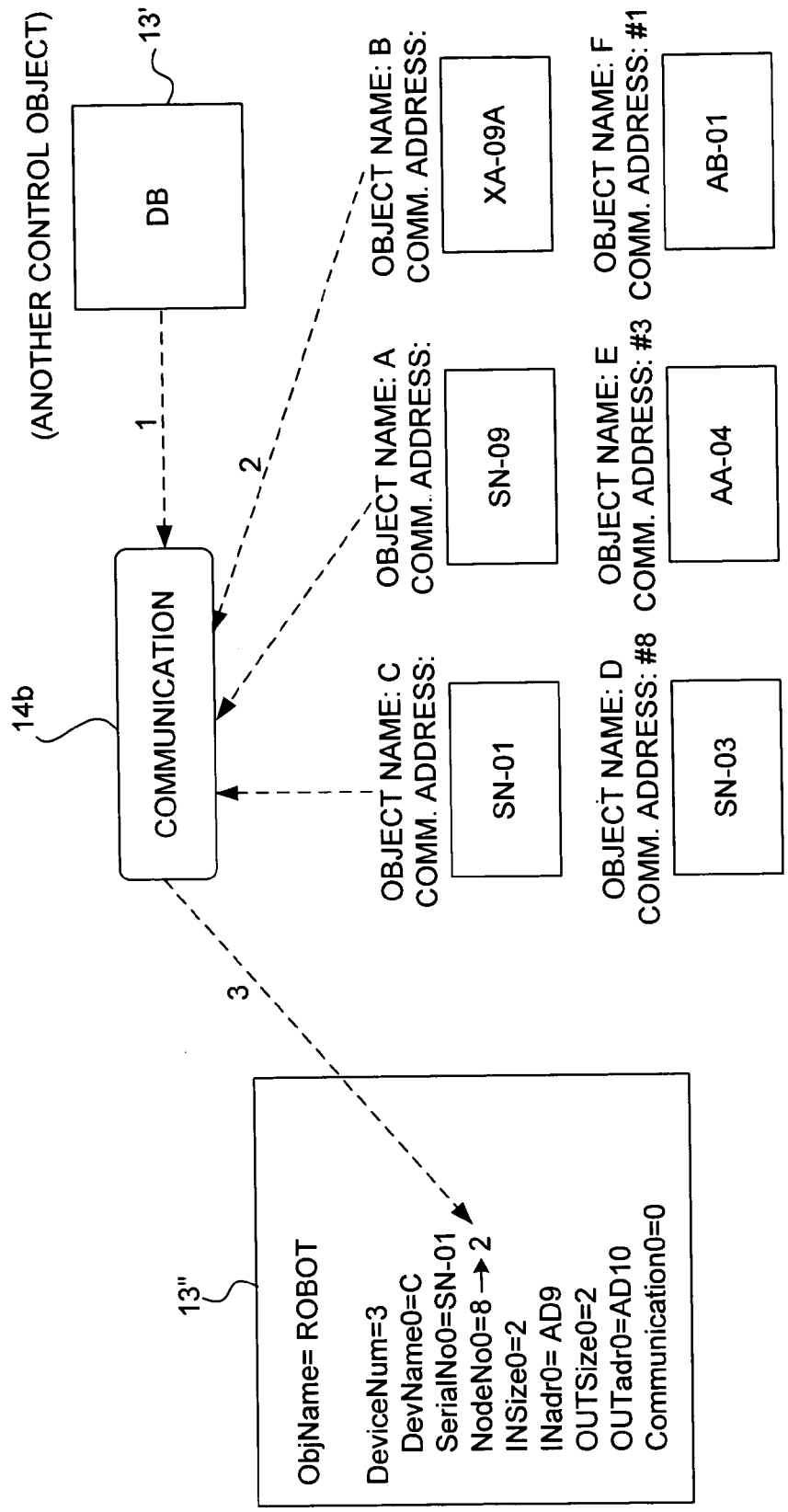
FIG. 18 shows the function of the communication processing means at the time of a reuse.

On the other hand, the communication processing means 14*b* obtains object name, serial number and communication address (hereinafter referred to as the registered device structure) from the already existing object database 13' (1), as shown in FIG. 18. Next, it asks what is connected to the device on the network (2) by requesting every node to answer with the object name and the communication address (node number). Each device queried responds to the question, and correspondence is obtained between the device names of the devices which are actually connected (or serial number in the case of a device which cannot store the device name) and their communication numbers (hereinafter referred to as the actual device structure). Thereafter, it is compared with the registered device structure obtained from the object database.

It is determined in this manner whether or not the actual device structure and the registered device structure match and empty communication addresses are noted. If any difference from the existing registered device advice is discovered, the stored content of the object database is corrected according to the actual device structure.

Next, it is determined whether or not the communication address of the device registered in the downloaded object database duplicates the communication address given to an existing registered device. If they are not duplicated, the communication address is set as is. If there is a duplication, it is automatically mapped to an empty communication address and this address is stored in the object database (3).

FIG. 18 shows a situation where three existing devices D, E, and F are respectively using communication address #8, #3 and #1, duplicating the communication addresses of Devices A, B and C which are constituent elements of control object "Robot". It is shown that an empty communication address #2 is automatically assigned to Device C. The node number is updated from #8 to #2. The communication addresses of the other devices A and B are similarly changed.

At the same time, node numbers are also assigned to the devices. In situations where the setting of a communication address to a device cannot be carried out through the network (such that it is carried out by a hardware switch such as the display switch of the device), it is communicated to external peripheral apparatus that the communication addresses must be reset.

Thus, even if the use of a control object is diverted, unrelated control objects are not affected. Even in the case of a duplicity of communication address, the user's load is reduced by automatic or manual mapping. Moreover, a change in a communication address does not affect the control program because the device name is not changed.

When a new control system is going to be built, furthermore, there are situations where a certain device cannot be provided and another device of the same class is substituted for carrying out the development incrementally or two devices are combined into one (such as changing two 8-point devices into one 16-point device). With a structure as shown in FIG. 13, it is sufficient to carry out the I/O configuration means of the device without changing the interface of the control object or the method of the control object. So-called polymorphism is accomplished, and incremental development and changing of parts become easier at the time of building a control system.

Figure 19:
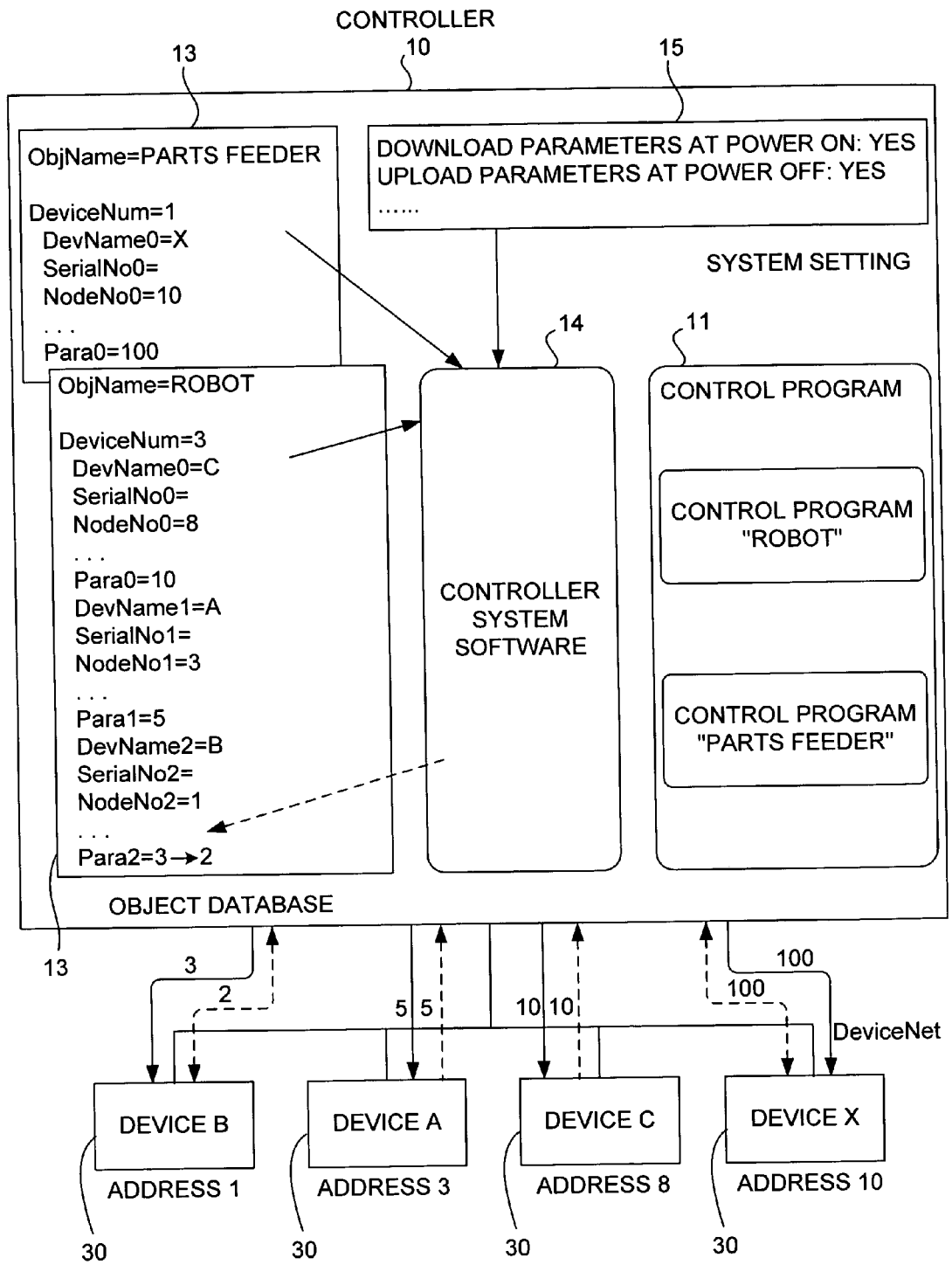
FIG. 19 shows a second embodiment of the invention.

FIG. 19 shows a second embodiment of this invention characterized as having extra functions of downloading set parameters to devices from the controller at the time of a system startup and uploading the set parameters of the devices at the time of a system shutdown.

Figure 20:
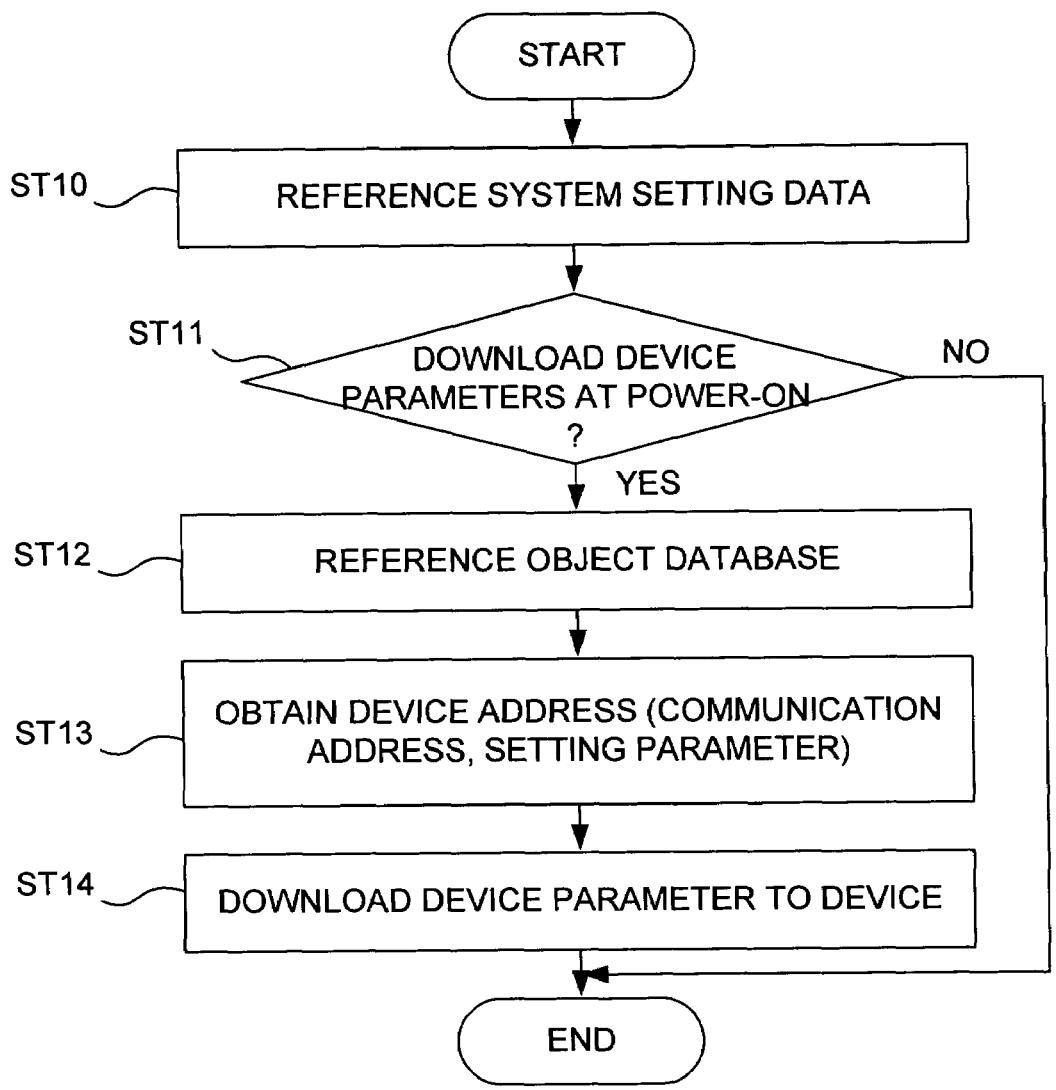
FIGS. 20 and 21 are flowcharts for explaining the functions of system software.

Numeral 15 indicates a memory 15 for storing system setting data for determining the operations of the controller. As a part of the system setting data, "Device parameters to be downloaded when power is switched on?" and "Device parameters to be uploaded when power is switched off?" are preliminarily determined in terms of yes or no. This setting may be accomplished, for example, by downloading at the same timing as the downloading of the control objects to the controller 10. The controller system software 14 has the function of processing the flowchart shown in FIG. 20 at the time of power-on and that of flowchart shown in FIG. 21 at the time of power-off.

When the system power is switched on and hence the power is switched on for the controller 10, the system setting data stored in the memory 15 are referenced (Step ST10 of FIG. 20) and it is checked therein to determined whether device parameters are to be downloaded at the time of the power-on (Step ST11). The process is ended if it is NO. If it is YES, the content of the object database 13 inside the controller 10 is referenced (Step ST12) to obtain therefrom the communication address and the setting parameters for the device which is the constituent element of the control object (Step ST13). Next, the setting parameters for the device at the communication address thus obtained are downloaded (Step ST14). Thus, the device setting is replaced by the contents of the setting parameters registered in the object database 13 every time power is switched on.

Figure 21:
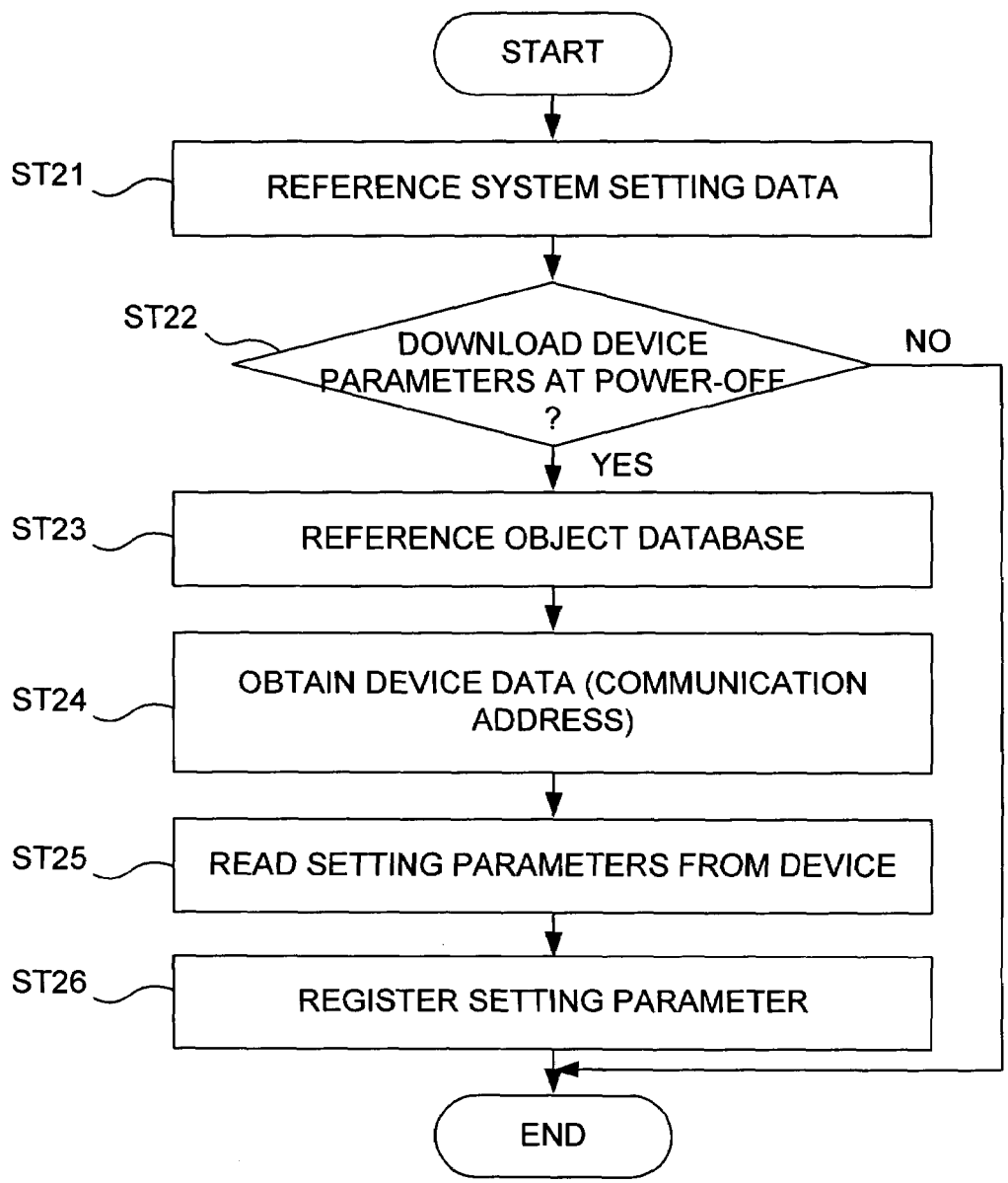

When the shutdown of the controller 10 (or its mode change) is commanded from its external peripheral apparatus, the control program being executed is stopped and controller system software 14 references the system setting data stored in the memory 15 (Step ST21 of FIG. 21). If NO is set for the question whether the device parameters are to be downloaded at the time of a power-down (NO in Step ST22), the process is stopped directly, that is, the power is shut down. If YES (YES in Step ST22), the content of the object database 13 inside the controller 10 is referenced (Step ST23) and the device address (communication address) is obtained (Step ST24). The setting parameters of the device at the communication address thus obtained are uploaded (Step ST25) and the uploaded setting parameters are stored in a corresponding area of the object database 13 (Step ST26). Thus, if setting parameters are changed by an on-site adjustment after the controller has been started, the changed content is registered in the object database 13.

If the aforementioned two questions are both set to YES, the system can be switched on with the data as set at the time of the previous showdown. This is effective since the adjustments survive the shutdown. Since the adjusted parameters stored in the object database as attributes of the control object, the matching between the actually set parameters for the device and the contents of the object database is guaranteed, and this makes the management of setting parameters easier. Even at the time of a reuse, it is convenient because the system can be reused under this matched condition of the actually set parameters. If YES is set to only the first question (regarding the system switch-on), the results of previously performed adjustment are not kept. This is useful when adjustments are made for a temporary purpose only.

FIG. 19 shows an example wherein there are two control objects "Robot" and "Parts feeder", the former comprising three devices A, B and C. It also shows that the communication address and the device parameter of Device A are respectively "3" and "5". In addition to the communication address and the device parameter, there are address data (hereinafter "setting parameter address data") such as indicating where the setting parameter should be stored in the device. In the case of DeviceNet (registered tradename of Open DeviceNet Vendor Association, Inc.), it is data such as class ID and instance ID that are stored. The example of FIG. 19 also shows that the communication address and the device parameter of Device B are respectively "1" and "2" and that those of Device C are respectively "8" and "10". The control object called "Parts feeder" is comprised of only one device called "X" and its communication address and device parameter are respectively "10" and "100".

In the case of this example, "3", "5", "10" and "100" are downloaded respectively to Devices B, A, C and X at the time of power-on (as shown by solid arrows), and the devices begin to operate with the downloaded parameters, while the controller begins to operate the control program. The setting parameter for Device B is changed from "3" to "2" while it is in use. Since the answer is YES to the question whether or not the device parameters are to be uploaded at the power-off, the device parameters "2", "5", "10" and "100" are returned for Devices B, A, C and X at the time of the next shutdown (as shown by broken arrows). The information that the setting parameter of "3" for Device B was downloaded and then changed to "2" by an on-site adjustment is then stored.

When the controller system software downloads the setting parameters at the time of power-on, the addresses are specified by the device names. This function is useful under various conditions. For example, in the case of a malfunction of a device, the power is switched off, a new device is installed and then the power is switched on again. In such a case, the newly installed device may have the same device name as the replaced device but its serial number will be different and its communication number will be unknown unless it is set by hardware such as a dip switch. If the devices are addressed by their device names, as explained above, the newly installed device can communicate with the controller 10, and the newly installed device will inform its communication number to the controller 10. Since each device is being managed both by its device name and its serial number which are stored in the object database, the controller retrieves the serial number of the device from the object database at the time of power-on and examines whether or not it matches with that of the exchanged device. In other words, the controller checks whether or not serial numbers match for each device with a matching device name.

If the serial numbers match, it means that the device has not been exchanged. If they do not match, the controller 10 (through its controller system software 14) asks the external peripheral apparatus whether or not the new device with the different serial number will be accepted as a device of the control object. If an affirmative answer is returned, the controller system software writes down the new serial number in the object database.

As for the device which has malfunctioned and been removed, its setting parameter in the object database 13 is downloaded. Thus, from the identification of a device requiring its setting parameter to be downloaded to its actual downloading can be call carried out automatically. Instead, device data (such as device name) may be provided from an external apparatus for the device to be removed such that the parameter for the removed device will be registered in the replacing device or the serial number of the newly installed device will be registered in the object database 13.

Figure 22:
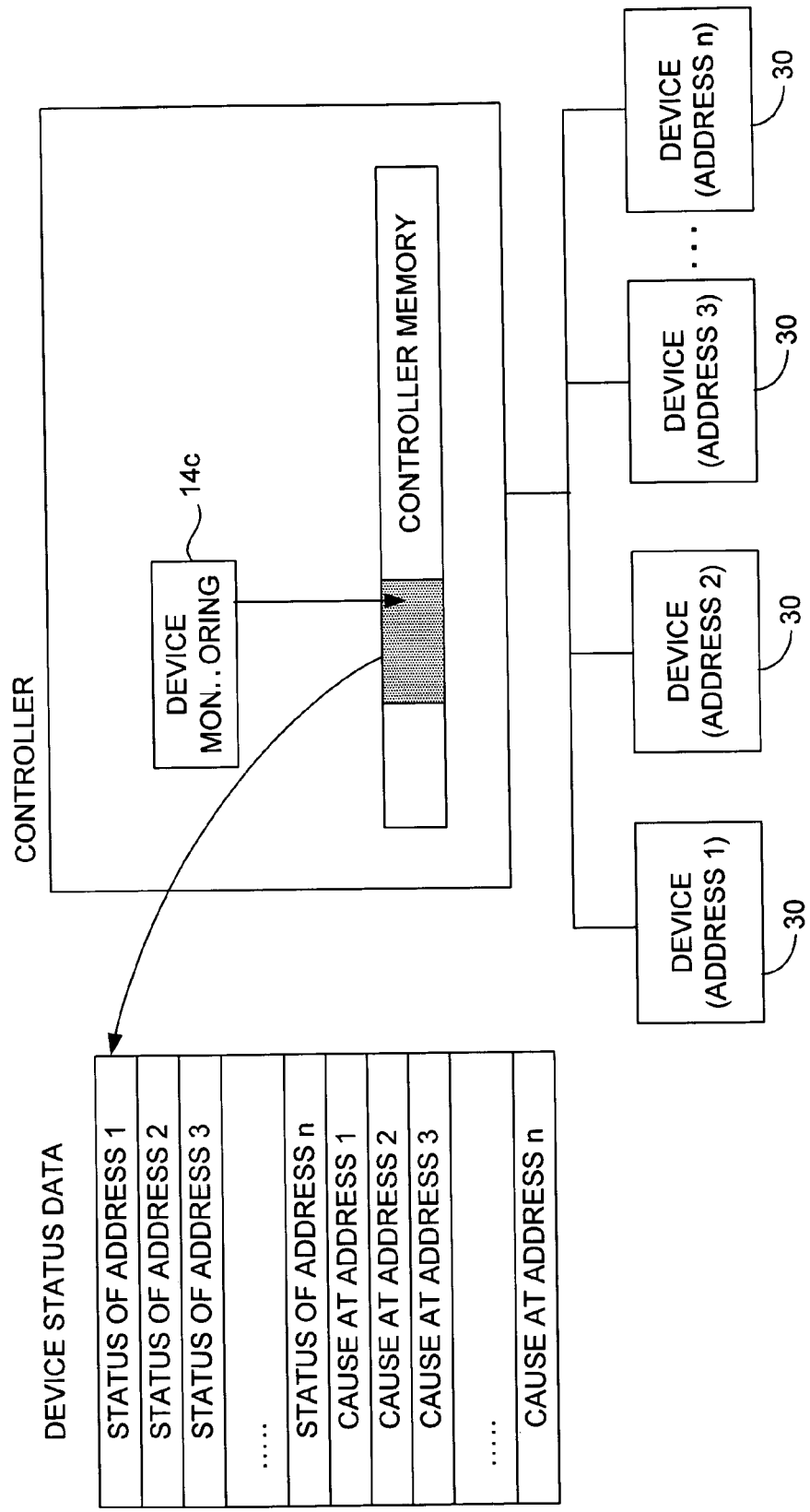
FIG. 22 shows a third embodiment of the invention.

FIG. 22 shows a third embodiment of the invention characterized as having the function of informing an abnormal situation if it happens in a device. As shown, a specified area is assigned on the controller memory 12 for the status of the devices of the control object (hereinafter "device status data"). Not only do the device status data include the status data on the individual communication addresses whether they are normal or abnormal, but there is also an area reserved for storing the causes of any abnormality. Each of the connected devices serves to store its own status (whether it is functioning normally or abnormally) and the cause of its abnormality (if it is functioning abnormally) in a specified area of the controller memory 12.

Figure 23:
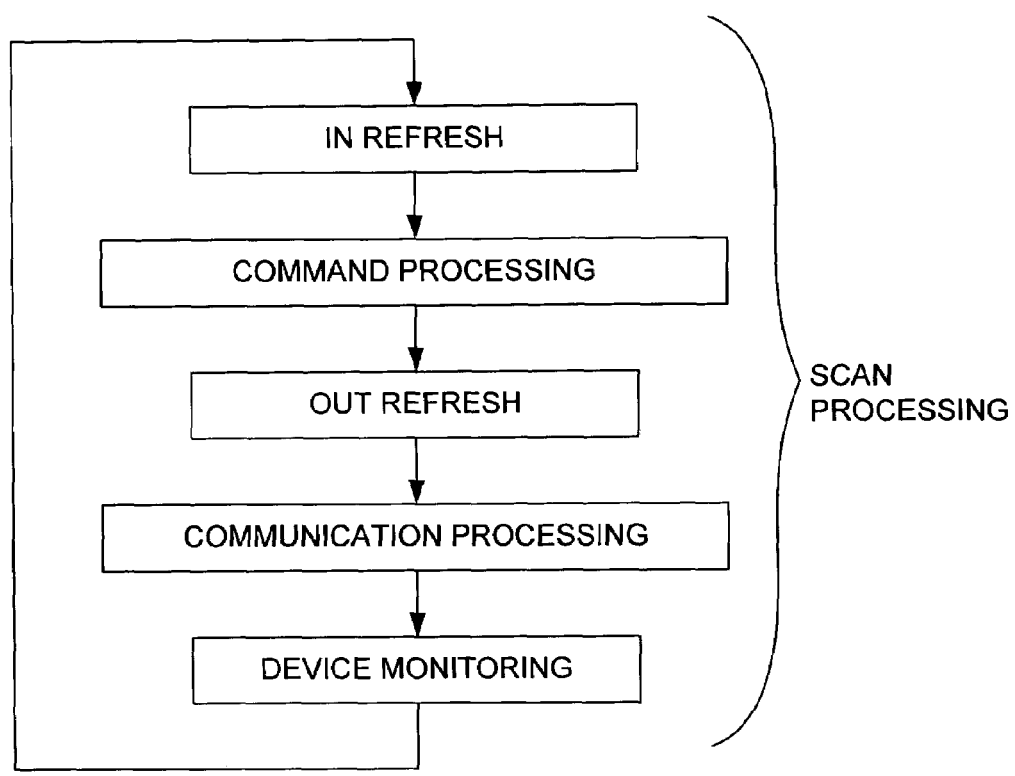
FIG. 23 is a flowchart of the operation of the monitor according to the third embodiment of the invention.

As shown by the flowchart of FIG. 23, the controller 10 carries out a cycle of processes (IN refresh→command processing→OUT refresh→communication processing) periodically. A device monitoring means 14c within the controller system software 14 (as shown in FIG. 3) monitors the device status data stored in the controller memory 12 in synchronism with this normal scanning process by the controller 10, say, once per cycle after the communication processing.

By this monitoring processing, the device monitoring means 14c of the controller system software 14 refers to the device status data to check whether or not there is an abnormally functioning communication address. If none of the communication addresses shows an abnormal condition, the monitoring process for that cycle is completed. If an abnormality is detected, the abnormality cause data assigned to the communication address in the abnormal condition are referenced. Next, the object database 13 is referenced to discover which control object corresponds to the communication address, and the device monitoring means 14c writes the control object name, the device name and the communication address of the address where the abnormality occurred, as well as the cause of the abnormality in the memory of the controller or an external peripheral apparatus.

The cause of the abnormality may be registered by way of either an abnormality code or a message. The former is advantageous in that the memory capacity may be small but disadvantageous in that the user may be required to consult a handbook to identify the cause from the code. The latter is disadvantageous in that a larger object database will be required but advantageous in that the user can readily identify the nature of the abnormality and also in that the message can be further converted into a voice message. In either case, the user can discover which control object corresponds to the abnormally functioning device and can hence effectively take measures against the condition. If a maintenance procedure for each kind of abnormality is also stored in the object database, the maintenance work can be carried out even more effectively. Since such data are stored on the side of the controller 10, the personal computer used for the maintenance need not be provided with any database. In other words, any personal computer may be used to access the controller to grasp the abnormal situation.

Figure 24:
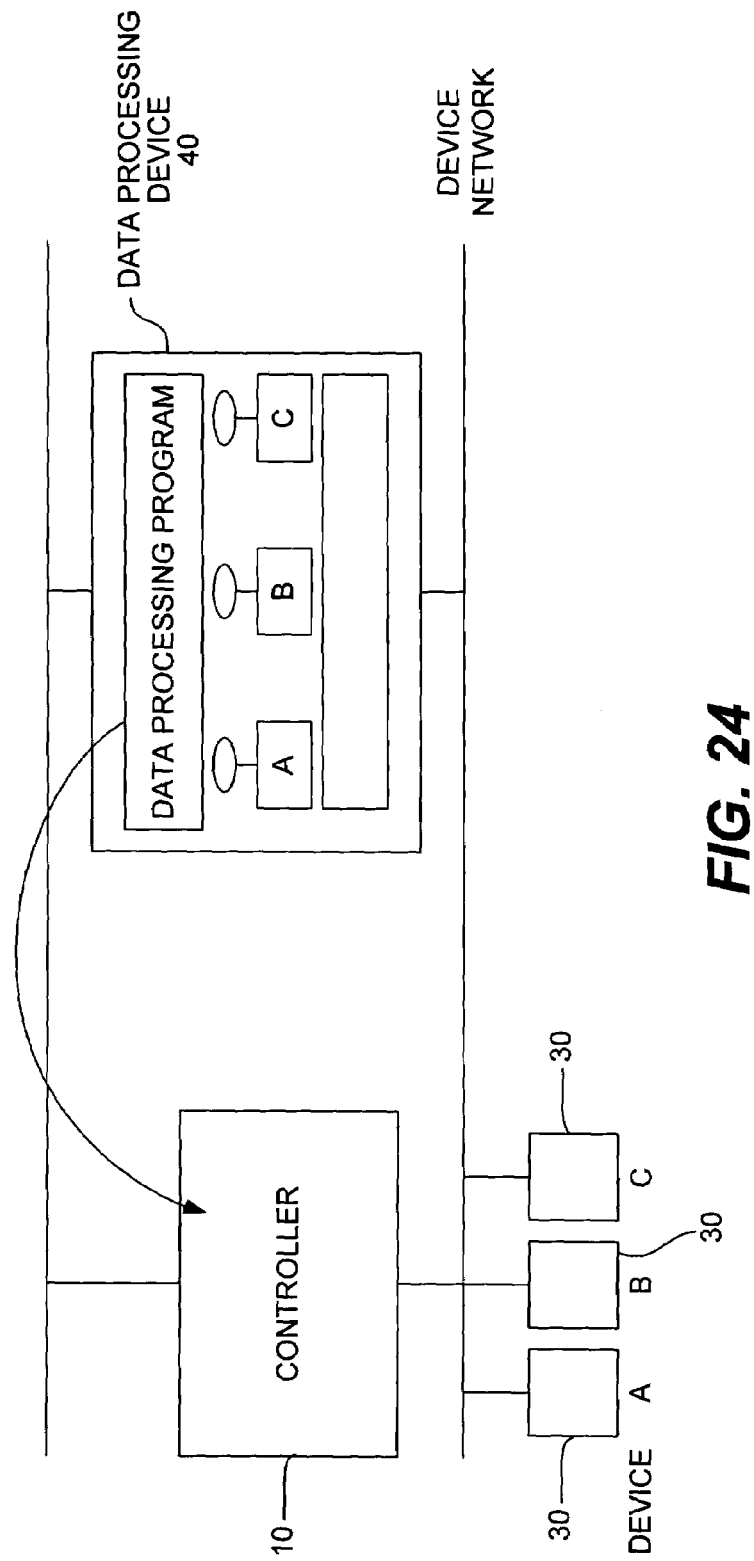
FIG. 24 shows a fourth embodiment of the invention.

FIG. 24 shows a fourth embodiment of the invention characterized in that the controller 10 and devices 30 are connected through a network such as DeviceNet (registered tradename of Open DeviceNet Vendor Association, Inc.) and that there is also a data processing device 40 such as HMI connected to the network (not as a node of the DeviceNet network but having the function of referencing the data which flow on the network like a protocol analyzer). Thus, this data processing device 40 can keep track of which node (communication address) is transmitting what kind of data without affecting the communication cycle between the controller 10 and the devices 30.

After objects (A, B and C) are defined for Devices A, B and C as explained above, control program and object database are downloaded to the data processing device 40 and the I/O configuration of the control objects is carried out by the data processing device 40. At the time of an actual system operation, the controller 10 controls Devices A, B and C. The control program of the data processing device 40 is used for the purpose of data processing at this moment, collecting data by referencing messages flowing through the network and carries out calculations on the basis of collected data on Devices A, B and C. The results of the calculations are fed back to the controller 10.

With the system thus structured, the status of the devices 30 controlled by the controller 10 can be monitored by the data processing device 40 in terms of logical names (object names) without affecting the control functions of the controller 10 while the controller 10 is controlling the devices 30. While the controller 10 is not controlling the devices 30, the data processing device 40 can write data into the devices 30 by using logical names (object). Even if the node number of a device is changed for the convenience of the program developer, the program for accessing the control object of the data processing device is not thereby affected. Even where the control system has already been created and the control program for the controller is not in the form of objects, the data processing device can be later connected to the network such that the devices 30 controlled by the controller 10 can be accessed by way of an object name and a logical name. In other words, the programming for data processing for the object database becomes easier and efficiency of development improves.

Moreover, it becomes possible to develop the controller 10 in a language, a programming style and a method of access to devices appropriate for the control and other functions, and the data processing program in terms of logical names for the devices convenient for data processing. Thus, control and data programs can be developed separately both in terms of timing and persons working on them.

As described above, devices and a control program for accessing them are handled together as one control object by means of an object database. Thus, once a control object (hardware+software) is developed, it can be reused such that time used in a production system for production of small amounts of many different items and for changing production steps in response to an interrupt requirement can be reduced.

Since the memory assignment is controlled in units of control objects, a system reuse can be effected without affecting other control objects or programs which use the control object being reused. In other words, since a control program and an object database are controlled as an integral unit, the reuse of a control object can be very simple. Since an addition of a new control object does not affect the other control objects, furthermore, a change in a production system with an equipment change can also be handled easily.

It is also possible to group together a plurality of devices to be treated as a control object or to handle a plurality of control objects as a single control object. In other words, different kinds of control objects can be defined by the user in response to different reuse requirements.

If the setting parameters of devices are treated as attributes of the control object, time required for maintenance at the time of a device malfunction can be shortened by downloading and uploading the setting parameters to the devices. With means for specifying the control object of a device which malfunctions, it becomes easier to discover what kind of abnormality has occurred in which unit of control. This also simplifies the maintenance work. Since the devices are accessed by way of their logical names, instead of their communication addresses, the program which is calling the control object is not affected. Since devices are accessed without directly referencing the memory in the controller, object interfaces and object services are not affected even when there is a change in the device of the control object. Thus, the control system can be developed incrementally and device can be interchanged freely.

In summary, this invention teaches the use of correlation data (object database) between a control program and devices such that the control program can access a device by referencing the correlation data to identify the address for the access. Thus, the control program and the devices can be treated as a unit (control object). This makes the reuse of the system easier and more dependable, without affecting unrelated control objects.

What is claimed is:

1. A system comprising a controller for controlling a device connected thereto and a tool which is attachable to said controller;

wherein said controller includes:

memory means for storing a control program and correlation data, said control program specifying said device by an object name, said correlation data correlating said control program with device data on said device, said device data including said object name and address information of said device; and communication processing means for accessing said device to thereby control said device by said control program by referencing said correlation data to identify said device data from said object name; and wherein said tool includes:

control program creating means for creating said control program;

correlation data creating means for creating said correlation data; and downloading means for downloading said correlation data created by said correlation data creating means to said controller.

2. The system of claim 1 wherein said communication processing means functions to determine an address through which said device is accessed and to store said address to be accessed as said correlation data.

3. The system of claim 2 further comprising:

a controller memory, data being transmitted between said device and said controller through a specified area of said controller memory; and mapping means for mapping said controller memory according to memory size of said device and storing results of the mapping as said correlation data.

4. The system of claim 2 further comprising:

a controller memory, data being transmitted between said device and said controller through a specified area of said controller memory, said controller memory having a specified area storing abnormality data on an abnormal condition of said device; and means for outputting maintenance data for said abnormal condition of said device according to said abnormality data and said correlation data.

5. The system of claim 1 wherein said device stores operation data required for operating said device, said controller functioning to obtain said operation data, to store said operation data and to download said stored operation data to said device when said device starts to be operated.

6. A method of operating the system of claim 1, said method comprising the steps of:

creating a control program with said tool for said device;

having said created control program downloaded to said controller;

causing said device to be controlled by said controller by said created control program;

identifying an access address for said device by referencing said correlation data stored in said memory means when said device is accessed by said control program; and accessing said identified access address.

7. The method of claim 6 further comprising the steps of storing said access address as said correlation data.

8. The method of claim 6 further comprising the steps of:

transmitting data between said device and said controller through a specified area of a controller memory; and mapping said controller memory according to memory size of said device and storing results of the mapping as said correlation data.

9. The method of claim 6 further comprising the step of causing said controller to function so as to obtain operation data stored by said device and required for operating said device, to store said operation data and to download said stored operation data to said device when said device starts to be operated.

* * * * *